US011455380B2

(12) United States Patent
Patel et al.

(10) Patent No.: US 11,455,380 B2
(45) Date of Patent: Sep. 27, 2022

(54) CHAIN-OF-CUSTODY OF DIGITAL CONTENT IN A DATABASE SYSTEM

(71) Applicant: International Business Machines Corporation, Armonk, NY (US)

(72) Inventors: Sumit Patel, Round Rock, TX (US); Leigh Williamson, Austin, TX (US); Howard N. Anglin, Leander, TX (US); Christopher M. Crane, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 16/196,876

(22) Filed: Nov. 20, 2018

(65) Prior Publication Data

US 2020/0159891 A1     May 21, 2020

(51) Int. Cl.
| | | |
|---|---|---|
| *H04L 29/06* | (2006.01) | |
| *G06F 21/16* | (2013.01) | |
| *H04L 9/06* | (2006.01) | |
| *G06F 16/27* | (2019.01) | |
| *H04L 9/00* | (2022.01) | |

(52) U.S. Cl.
CPC .............. *G06F 21/16* (2013.01); *G06F 16/27* (2019.01); *H04L 9/0637* (2013.01); *H04L 9/0643* (2013.01); *H04L 9/50* (2022.05)

(58) Field of Classification Search
CPC ......... G06F 21/16; G06F 16/27; H04L 9/0637
See application file for complete search history.

(56) References Cited

U.S. PATENT DOCUMENTS

| | | |
|---|---|---|
| 5,491,511 A | 2/1996 | Odle |
| 7,460,149 B1 | 12/2008 | Donovan et al. |
| 3,046,341 A1 | 10/2011 | Shinkai et al. |
| 9,870,508 B1 | 1/2018 | Hodgson et al. |
| (Continued) | | |

OTHER PUBLICATIONS

Svenblad, "An Analysis of Using Blockchains for Processing and Storing Digital Evidence" Diss, Dalama University (2018). (RELATED).

(Continued)

*Primary Examiner* — Shin-Hon (Eric) Chen

(57) ABSTRACT

An example operation may include one or more of authorizing a blockchain for a video file, generating a first tracking value for an entry block referencing the video file, the first tracking value generated based on first data and the video file, receiving second data for each of additional blocks in the blockchain, generating second tracking values based on the second data of the additional blocks, forming the additional blocks including the second tracking values, respectively, appending the additional blocks to the entry block, the entry block and the additional blocks cryptographically linked in an ordered sequence, each of the additional blocks referencing a version of the video file which corresponds to an original version of the video file as referenced by the entry block or a processed version of the video file, the second data in each of the additional blocks indicative of processing performed on the version of the video file in that block, and tracing through the blockchain based on the first and second tracking values to confirm an auditable and immutable chain-of-custody of the video file.

17 Claims, 24 Drawing Sheets

(56) References Cited

U.S. PATENT DOCUMENTS

| | | | |
|---|---|---|---|
| 10,164,952 B2* | 12/2018 | Vandervort | H04L 9/3247 |
| 10,581,847 B1* | 3/2020 | Sun | H04L 63/0876 |
| 2002/0146232 A1 | 10/2002 | Harradine et al. | |
| 2003/0126432 A1 | 7/2003 | Tonisson | |
| 2009/0089592 A1 | 4/2009 | Kudo | |
| 2010/0088522 A1 | 4/2010 | Barrus et al. | |
| 2013/0166906 A1 | 6/2013 | Swaminathan et al. | |
| 2018/0068091 A1* | 3/2018 | Gaidar | G06F 21/16 |
| 2018/0096121 A1 | 4/2018 | Goeringer et al. | |
| 2018/0285996 A1* | 10/2018 | Ma | G06F 16/2428 |
| 2018/0352268 A1* | 12/2018 | O'Hanlon | H04N 21/231 |
| 2018/0374037 A1* | 12/2018 | Nazzari | G09C 5/00 |
| 2019/0013934 A1* | 1/2019 | Mercuri | G06Q 20/3827 |
| 2019/0050856 A1* | 2/2019 | Vintila | H04L 9/30 |
| 2019/0132138 A1* | 5/2019 | Finlow-Bates | H04L 9/3236 |
| 2019/0158274 A1* | 5/2019 | Tormasov | H04L 9/3239 |
| 2019/0163912 A1* | 5/2019 | Kumar | H04L 9/3247 |
| 2019/0197130 A1* | 6/2019 | Huang | H04L 63/00 |
| 2019/0199535 A1* | 6/2019 | Falk | H04L 9/0861 |
| 2019/0372756 A1* | 12/2019 | Kim | G06F 16/182 |
| 2019/0386817 A1* | 12/2019 | Carson | G06F 21/64 |
| 2020/0099513 A1* | 3/2020 | Angelo | H04L 9/0643 |
| 2020/0120023 A1* | 4/2020 | Munson | H04L 65/4084 |
| 2021/0019326 A1* | 1/2021 | Rauch | G06F 16/9027 |

OTHER PUBLICATIONS

Young, "Changing Governance Models by Applying Blockchain Computing." Catholic University Journal of Law and Technology 26.2 (2018): 4. (RELATED).

* cited by examiner

640

CHAIN-OF-CUSTODY OF DIGITAL CONTENT IN A DATABASE SYSTEM

TECHNICAL FIELD

This application generally relates to information management, and more particularly to chain-of-custody of digital content in a database system.

BACKGROUND

The protection of information against malicious attack has never been more important. Every year, tampering, hacking, malware, phishing, and other security breaches cost individuals and corporations hundreds of millions of dollars. Various attempts have been made to counter these threats, but traditional approaches have proven inadequate and limited in scope. For example, many attempts have been made to protect identity and financial information, but other types of information have been left largely unprotected. Examples include medical records, voting data, legal evidence, and other forms of digital content. In these cases, tampering or alteration of the digital content may render them invalid or otherwise inadmissible.

SUMMARY

One example embodiment provides a system that includes an interface, a storage area, and a processor that is configured to perform one or more of an interface to receive and store a video file, a storage area to store a blockchain that references the video file, the blockchain which includes a plurality of cryptographically linked blocks in an ordered sequence, each of the plurality of blocks which includes a header, a version of the video file with metadata, and a tracking value, the version of the video file in each of the plurality of blocks which corresponds to an original version of the video file or a processed version of the video file, and a processor to append each of the plurality of blocks, except an entry block, to a previous block of the plurality of blocks with no change to the previous block to form the blockchain, the processor to generate the tracking value for each of the plurality of blocks based on one or more attributes in relation to the version of the video file referenced by the block and to trace through the plurality of blocks in the blockchain based on the tracking value for each of the plurality of blocks to confirm an auditable and immutable chain-of-custody of the video file.

Another example embodiment provides a method that includes one or more of authorizing a blockchain for a video file, generating a first tracking value for an entry block referencing the video file, the first tracking value generated based on first data and the video file, receiving second data for each of additional blocks in the blockchain, generating second tracking values based on the second data of the additional blocks, forming the additional blocks including the second tracking values, respectively, appending the additional blocks to the entry block, the entry block and the additional blocks cryptographically linked in an ordered sequence, each of the additional blocks referencing a version of the video file which corresponds to an original version of the video file as referenced by the entry block or a processed version of the video file, the second data in each of the additional blocks indicative of processing performed on the version of the video file in that block, and tracing through the blockchain based on the first and second tracking values to confirm an auditable and immutable chain-of-custody of the video file.

A further example embodiment provides a non-transitory computer readable medium storing instructions which, when read by a processor, causes the processor to perform one or more of authorize a blockchain for a video file, generate a first tracking value based on first data and the video file, form an entry block referencing the video file and the first tracking value, generate second tracking values based on second data of additional blocks, form the additional blocks including the second tracking values, respectively, append the additional blocks to the entry block, the additional blocks cryptographically linked in an ordered sequence, each of the additional blocks referencing a version of the video file which corresponds to an original version of the video file as set forth in the entry block or a processed version of the video file, the second data in each of the additional blocks indicative of processing performed on the version of the video file in that block, and trace through the blockchain based on the first and second tracking values to confirm an auditable and immutable chain-of-custody of the video file.

DETAILED DESCRIPTION

Figure 1:
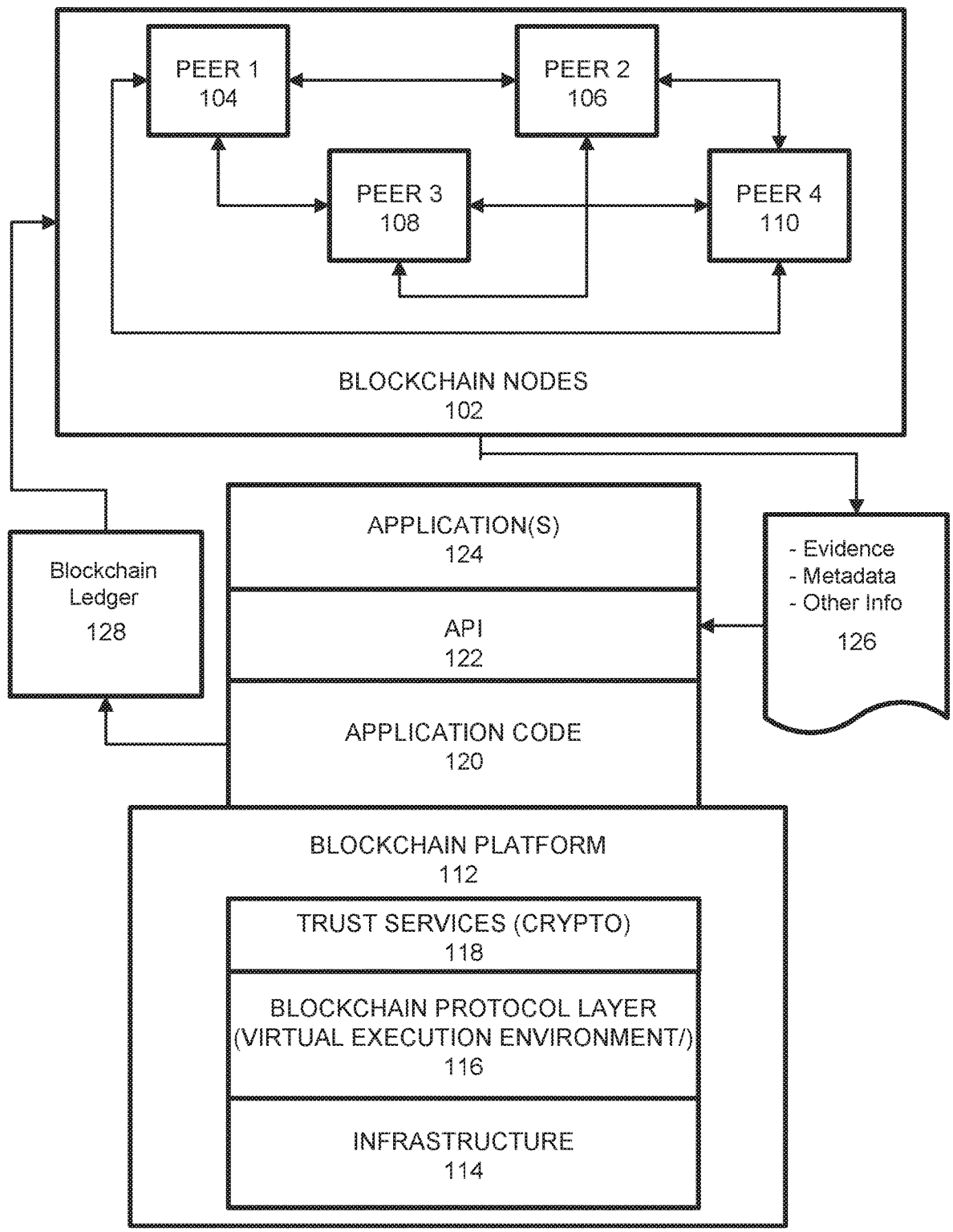
FIG. 1 illustrates an embodiment of a blockchain architecture configuration.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiments. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which may protect and manage digital content in a database storage system. The database storage system may be a centralized database system or a decentralized database system.

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

While a centralized database is beneficial for many applications and may be used to store digital content in one or more embodiments described herein, the use of a centralized database may not be optimal for all applications. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased.

Also, bottlenecks may occur when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Moreover, because a database storage system has minimal to no data redundancy, data that is unexpectedly lost is very difficult to retrieve, other than, for example, through manual operation from back-up storage.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. Blockchain transactions may be "endorsed" before being committed to the blockchain, while transactions which are not endorsed are disregarded. One type of endorsement policy allows chaincode to specify endorsers for a transaction in the form of a set of peer nodes that are to be used for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes (or participants) are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). For example, in accordance with one embodiment, a participant may be member of a credentialed entity with body-worn cameras, body-worn camera manufacturers, court systems, attorney teams, and others.

Another type of node is a peer node which can receive client submitted transactions, commit the transactions and maintain a state and a copy of the ledger of blockchain transactions. Peers can also have the role of an endorser, although it is not a requirement. An ordering-service-node, or orderer, is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as encrypted (e.g., hash-linked) blocks. Each block contains a data (e.g., a sequence of N transactions, digital evidence files, etc.), where N is equal to or greater than one. The block header includes an encrypted form (e.g., hash) of the data in the block, as well as a hash of the header in a prior block. In this way, all transactions on the ledger may be sequenced and cryptographically linked together. Accordingly, it is not possible to tamper with the ledger data without breaking the hash links. A hash of a most recently added blockchain block represents the data on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

A blockchain is different from a traditional database in that blockchain is not a central storage but rather a decentralized, immutable, and secure storage, where nodes share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

One of the benefits of the example embodiments is that it improves the functionality of a computing system by providing tracking values in the blocks of the blockchain that establish an auditable and immutable chain-of-custody of the blockchain data, thereby making the blockchain and its attendant data suitable for use as digital evidence in a court or administrative proceeding. In accordance with one or more embodiments, the blockchain network interfaces with participants which gain access to and permission to process data in the blockchain through the rules in various smart contracts. The participants may access, copy, move the storage location of, analyze, redact, or otherwise alter the data in the blockchain, as represented in appended blocks, through processing operations at various stages of an evidence management system. Moreover, the blockchain may be queried to trace through the blockchain based on the tracking values of the blocks to make available pertinent evidence.

FIG. 1 illustrates an embodiment of a blockchain architecture configuration 100 which may include certain blockchain elements, for example, a group of blockchain nodes 102. The blockchain nodes 102 may include one or more nodes 104-110 (e.g., four nodes are shown by example only). These nodes participate in a number of activities, such as blockchain transaction addition and validation process (consensus). One or more of the blockchain nodes 104-110 may endorse transactions based on endorsement policy and may provide an ordering service for all blockchain nodes in the architecture 100.

A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions (e.g., asset exchange transactions) and keep information private.

In accordance with one or more embodiments, an asset of the blockchain may include digital evidence plus associated metadata about the contents of the evidence. A participant of the blockchain may include any tool or computer system that stores and/or manipulates the digital evidence, metadata, and/or any other information of the blockchain in any way (e.g., anything that "touches" the evidence, for example, by altering it, making a copy of it, accessing it, storing it, etc.), all of which may be understood as processing the evidence. A transaction of the blockchain may include transfer of control of the digital evidence from one tool or storage location to another, or from one participant to another.

The blockchain architecture configuration of FIG. 1 may process and execute program/application code 120 via one or more interfaces exposed, and services provided, by blockchain platform 112. The code 120 may control blockchain assets. For example, the code 120 can store and transfer data, and may be executed by nodes 104-110 in the form of a smart contract and associated chaincode with conditions or other code elements subject to its execution. As a non-limiting example, smart contracts may be created to execute reminders, updates, and/or other notifications subject to the changes, updates, etc.

The smart contracts can themselves be used to identify rules associated with authorization and access requirements and usage of the ledger. For example, the information 126 including evidence, sensor data and/or other metadata, etc., may be processed by one or more processing entities (e.g., virtual machines) included in the blockchain layer 116. The result 128 may include a blockchain ledger (e.g., see FIG. 1) for the evidence along with metadata and tracking values for establishing immutable chain-of-custody of the evidence. The physical infrastructure 114 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data for the blockchain is identified.

Chaincode may include a code interpretation of a smart contract, with additional features. For example, chaincode may be program code deployed on a computing network, where it is executed and validated by chain validators together during a consensus process. In one embodiment, the chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. For example, in FIG. 1, the chaincode may control the writing of metadata to the evidence, tracking values, and/or other information to be included in the blockchain. The chaincode may also updated, release, or acquire smart contracts or commit transactions to the block chain. The evidence, metadata, and other information of the blockchain may then be provided one or more of the nodes 104-110. Example embodiments of these features will be described in greater detail below.

Figure 2:
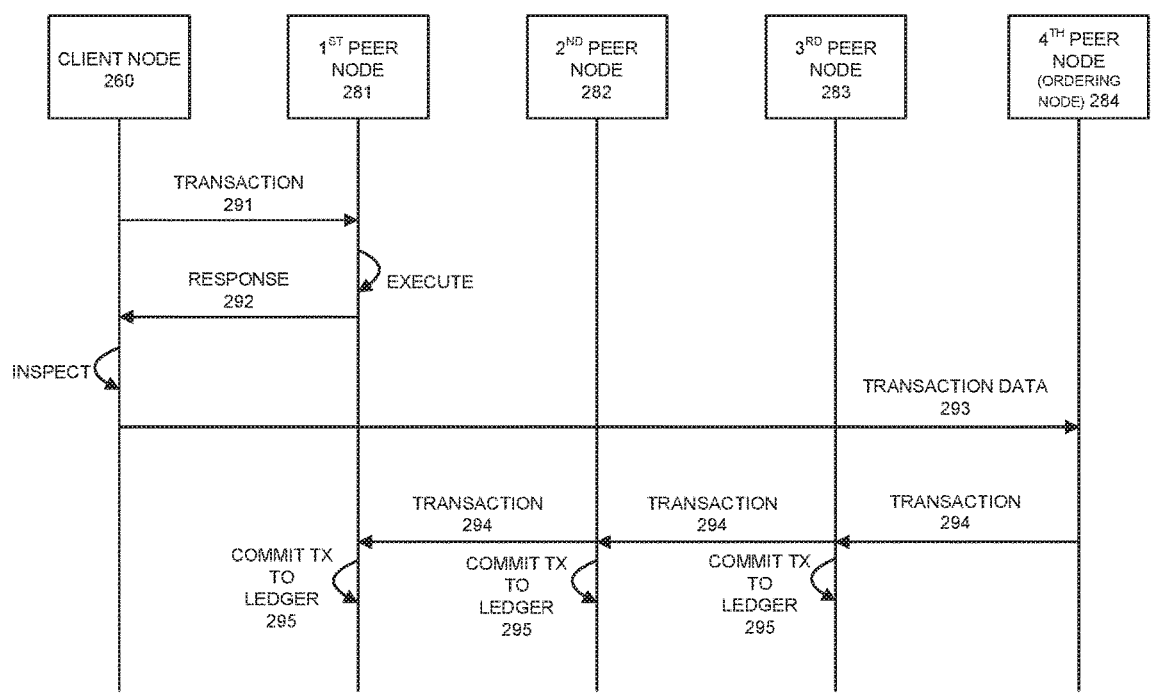
FIG. 2 illustrates an embodiment of a transactional flow between nodes of a blockchain.

FIG. 2 illustrates an embodiment of a transactional flow 250 between nodes of the blockchain. The transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (e.g., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. No updates may be made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (e.g., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
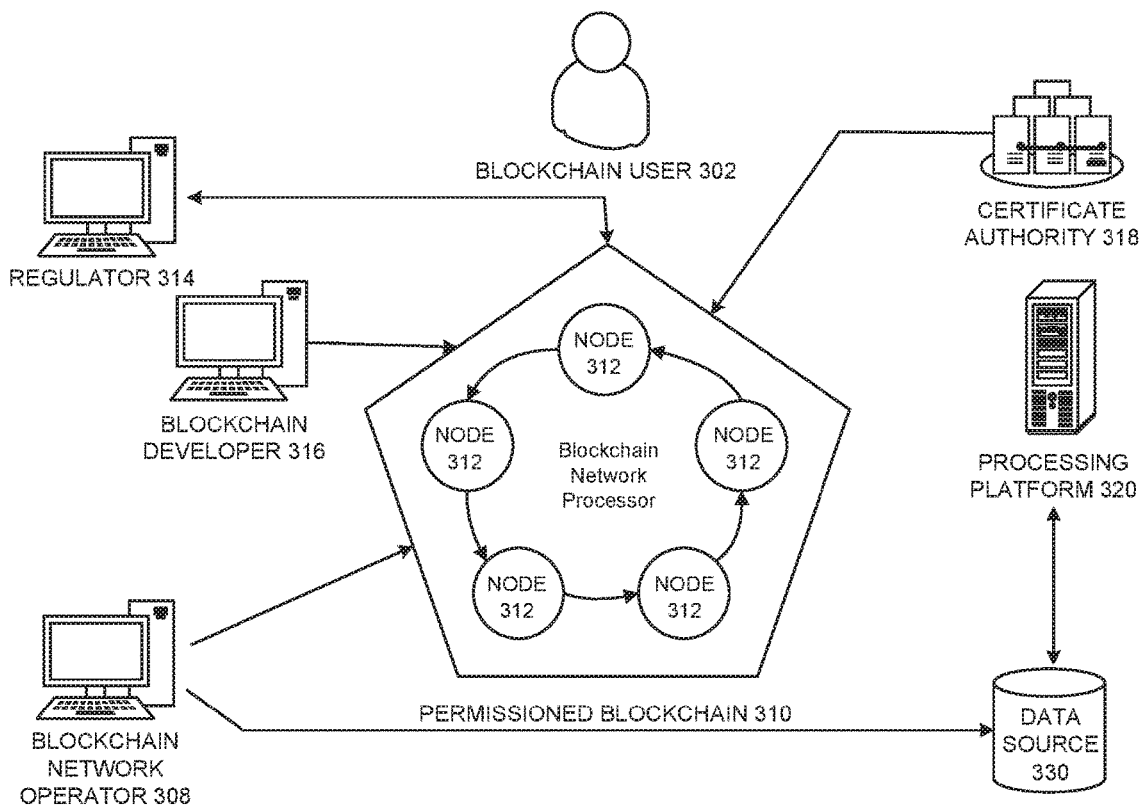
FIG. 3 illustrates an example of a permissioned blockchain network.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
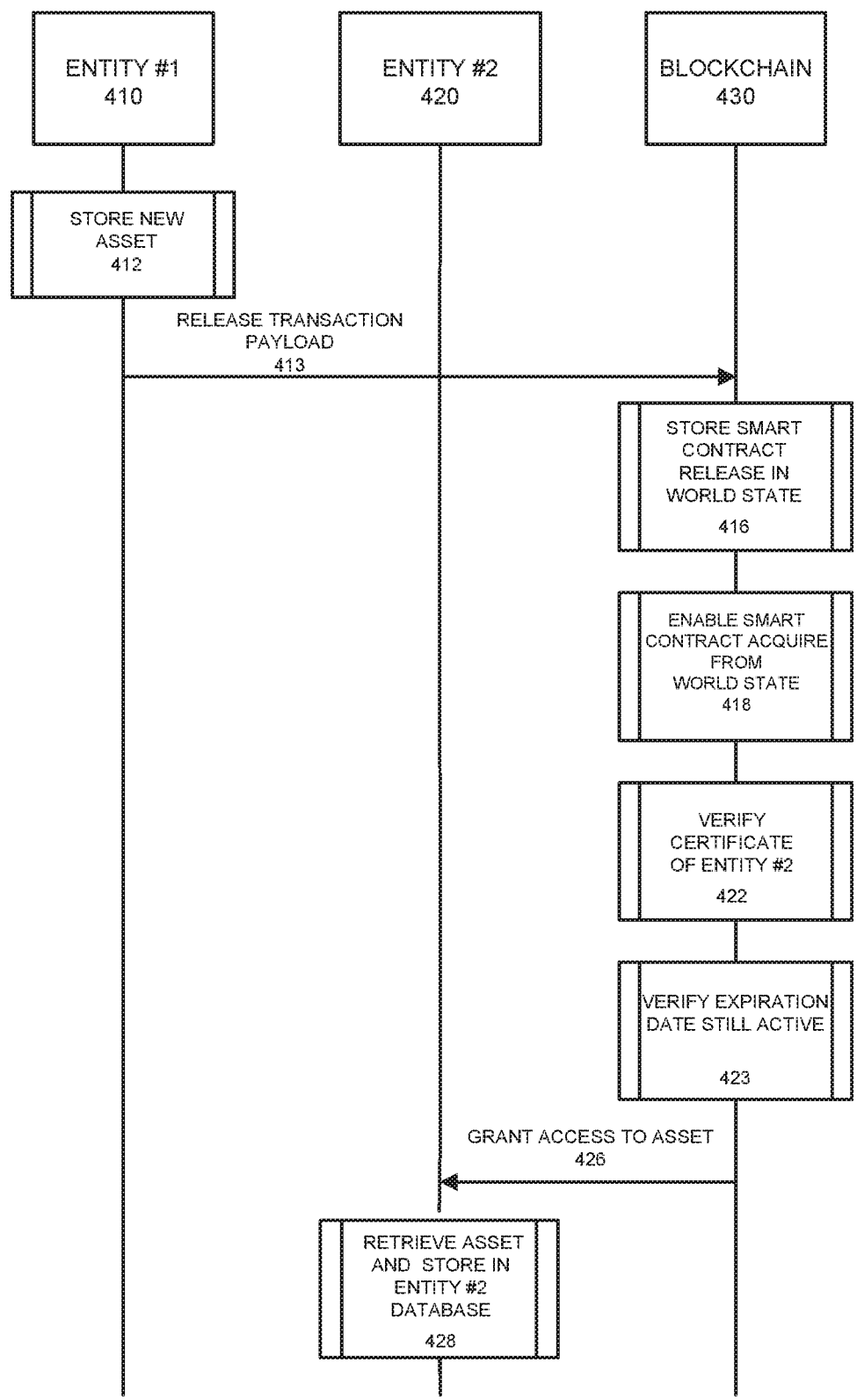
FIG. 4 illustrates an embodiment of messaging in the blockchain network.

FIG. 4 illustrates an embodiment of messaging 400 that may take place between participants, or entities/users, 410 and 420 of the blockchain network and the blockchain 430. In 412, an entity 410 stores a new asset (e.g., some form of processing of the evidence protected by the blockchain) to be added in a block of the blockchain 430. A transaction payload is then released to the blockchain 430 at 413. A smart contract release in the world state of the blockchain is then stored at 416. Acquisition of the smart contract is then enabled from the world state at 418. A certificate of entity 2 is then verified, at 422, and a check is performed to verify that the expiration date of the certificate has not expired, e.g., is still active, at 423. Access to the blockchain network, or other action sought to be taken by entity 2, is then granted, at 426, and the asset (e.g., evidence) requested by entity 2 is then retrieved 428 from the blockchain network and made accessible to entity 2. These messaging operations may be performed, for example, in association with a processor or managing entity/software of the blockchain network through one or more appropriate interfaces.

Figure 5:
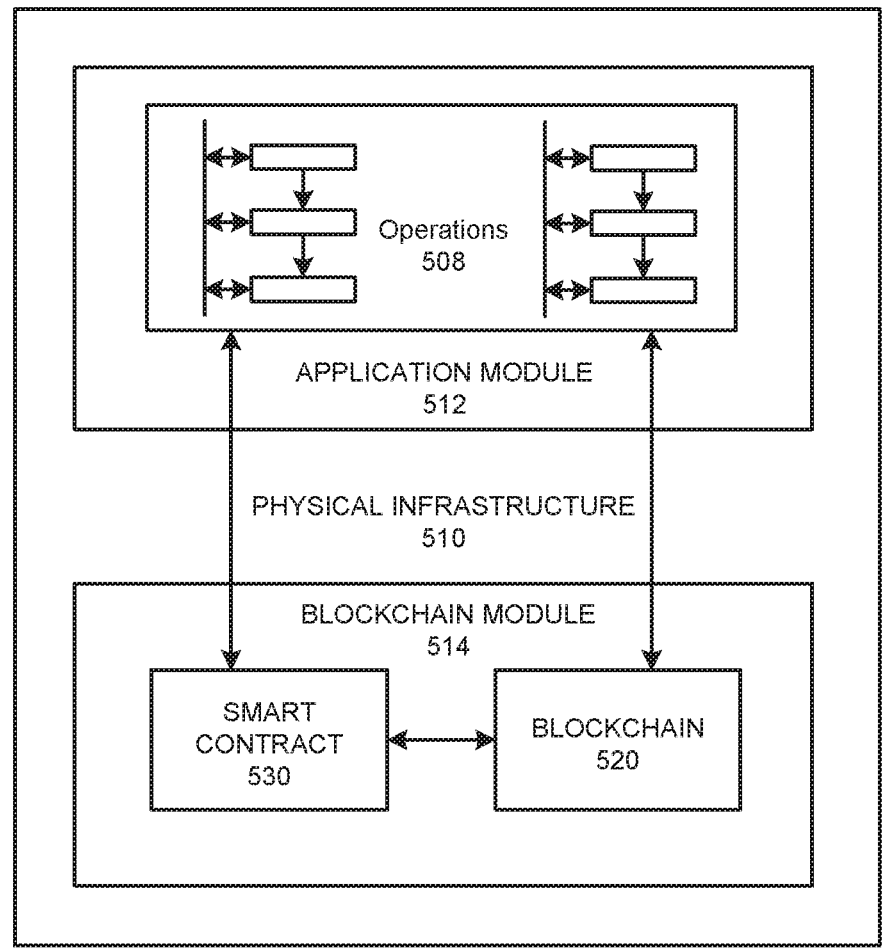
FIG. 5 illustrates an embodiment of a system for performing operations in a blockchain.

FIG. 5 illustrates an embodiment of a system 500 that includes a physical infrastructure 510 configured to perform various operations for the blockchain. The physical infrastructure 510 includes a module 512 and a module 514. The module 514 includes a blockchain 520 and a smart contract 530 (which may reside on the blockchain 520), that may execute any of the operations 508 (in module 512) included in any of the example embodiments. The operations 508 may include one or more of the embodiments described or depicted and may represent output or written information that is written or read from one or more smart contracts 530 and/or blockchain 520. The physical infrastructure 510, the module 512, and the module 514 may include one or more computers, servers, processors, memories, and/or wireless communication devices. Further, the module 512 and the module 514 may be a same module.

Figure 6:
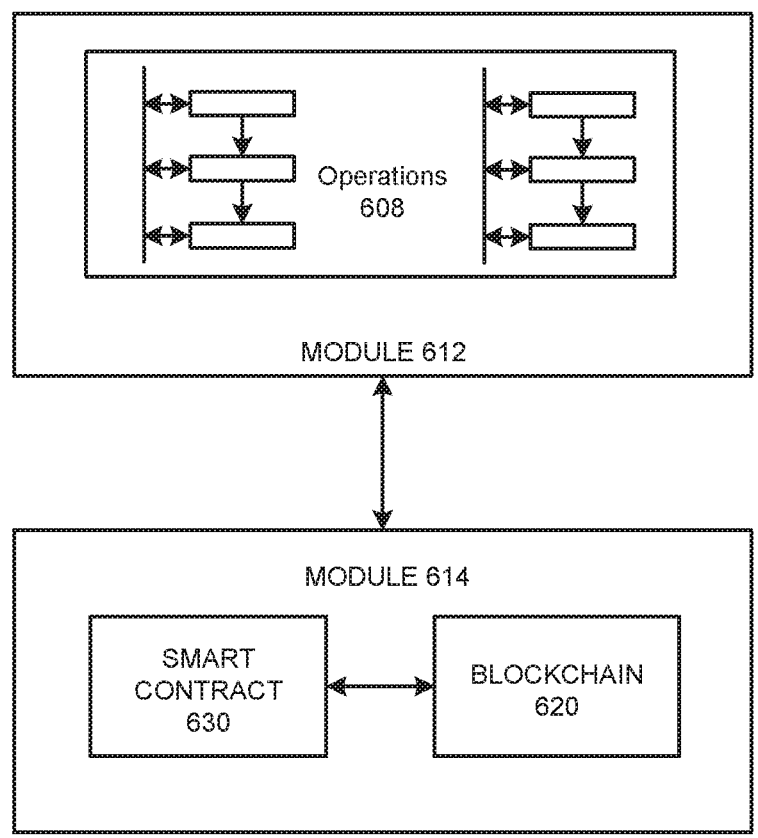
FIG. 6 illustrates another embodiment of a system to perform operations in a blockchain.

FIG. 6 illustrates another system 640 configured to perform various operations according to example embodiments. Referring to FIG. 6, the system 640 includes a module 612 and a module 614. The module 614 includes a blockchain 620 and a smart contract 630 (which may reside on the blockchain 620), that may execute any of the operational steps 608 (in module 612) included in any of the example embodiments. The operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 7:
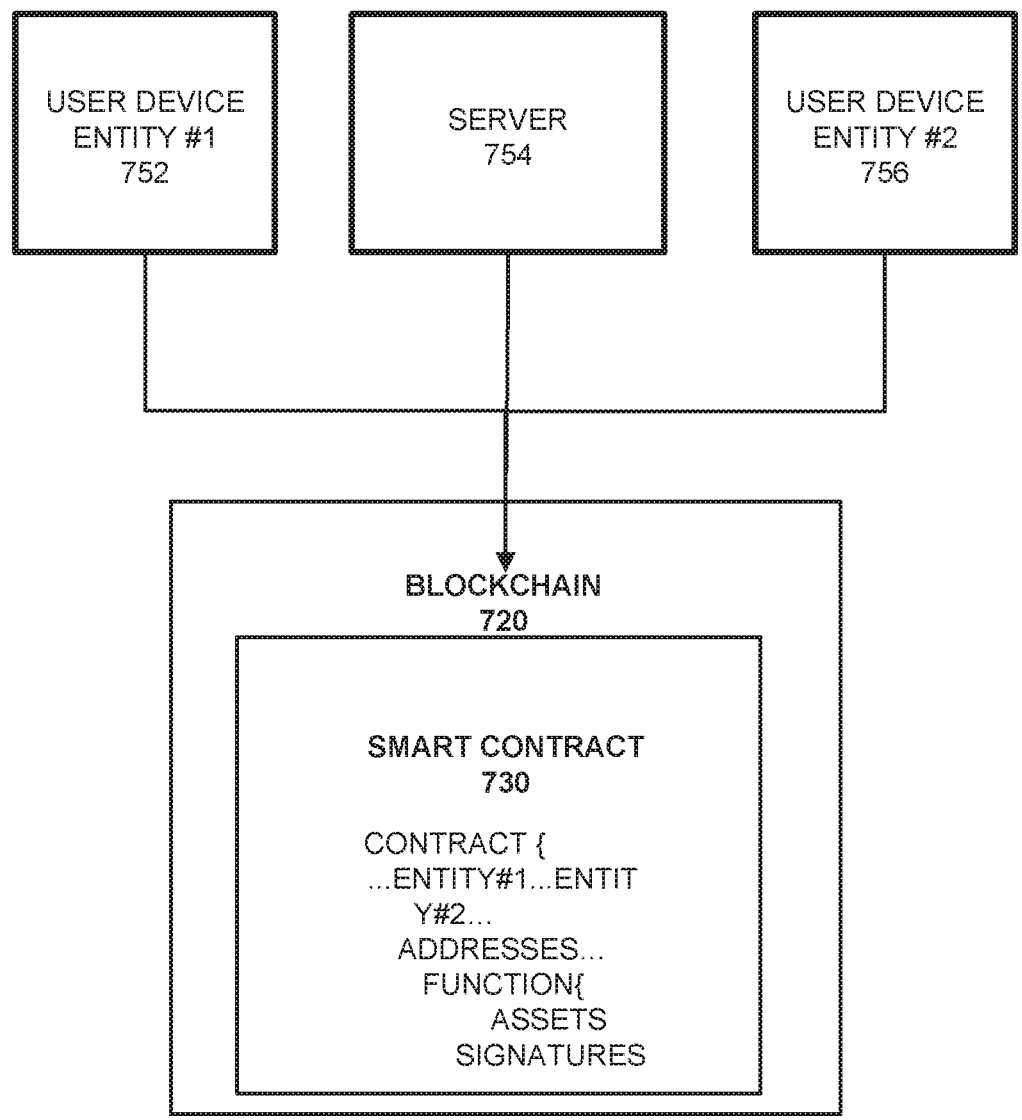
FIG. 7 illustrates an embodiment of a smart contract configuration for a blockchain.

FIG. 7 illustrates an embodiment of a smart contract configuration 750 among contracting parties and a mediating server configured to enforce the smart contract rules/terms on the blockchain. The configuration 750 may represent a communication session, an asset transfer session or a process or procedure that is driven by a smart contract 730 which explicitly identifies one or more user devices 752 and/or 756. The execution, operations and results of the smart contract execution may be managed by a server 754. Content of the smart contract 730 may require digital signatures by one or more of the entities 752 and 756 which are parties to the smart contract transaction. The results of the smart contract execution may be written to a blockchain 720 as a blockchain transaction. The smart contract 630 resides on the blockchain 720, which may reside on one or more computers, servers, processors, memories, and/or wireless communication devices. The blockchain 720 may include digital evidence as discussed herein.

Figure 8:
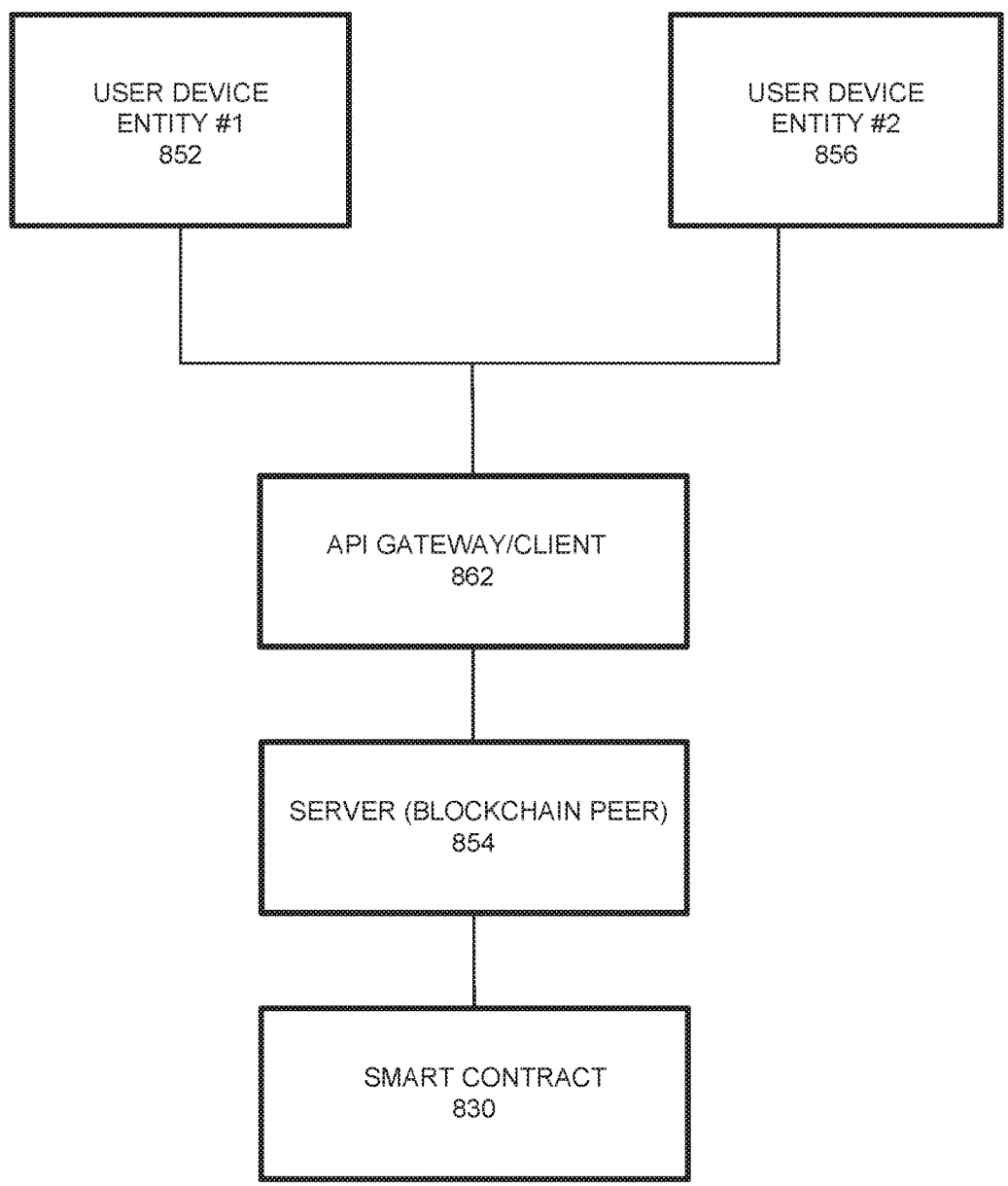
FIG. 8 illustrates an embodiment of an application programming interface (API) gateway for accessing a blockchain and/or associated elements.

FIG. 8 illustrates an embodiment of a system 860 including an application programming interface (API) gateway 862 provides a common interface to access blockchain logic (e.g., smart contract 830 or other chaincode) and data (e.g., distributed ledger, etc.). In this example, the API gateway 862 is a common interface to perform transactions (invoke, queries, etc.) on the blockchain by connecting one or more entities 852 and 856 to a blockchain peer (e.g., server 854). The server 854 may be a blockchain network peer component that holds a copy of the world state and a distributed ledger allowing clients 852 and 856 to query data on the world state, as well as submit transactions into the blockchain network where, depending on the smart contract 830 and endorsement policy, endorsing peers will run the smart contracts 830. The smart contracts shown in FIGS. 5-8 may be the same or different. In one embodiment, each participant in the blockchain network may store a copy of the distributed ledger and blockchain with an immutable history of all the transactions that took place in the network relative to the blockchain.

The embodiments described herein may be implemented in hardware, in a computer program executed by a processor, in firmware, or in a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium.

An exemplary storage medium may be coupled to the processor such that the processor may read information from, and write information to, the storage medium. In one embodiment, the storage medium may be integral to the processor. The processor and the storage medium may reside in an application specific integrated circuit ("ASIC"). In one embodiment, the processor and the storage medium may reside as discrete components.

Figure 9A:
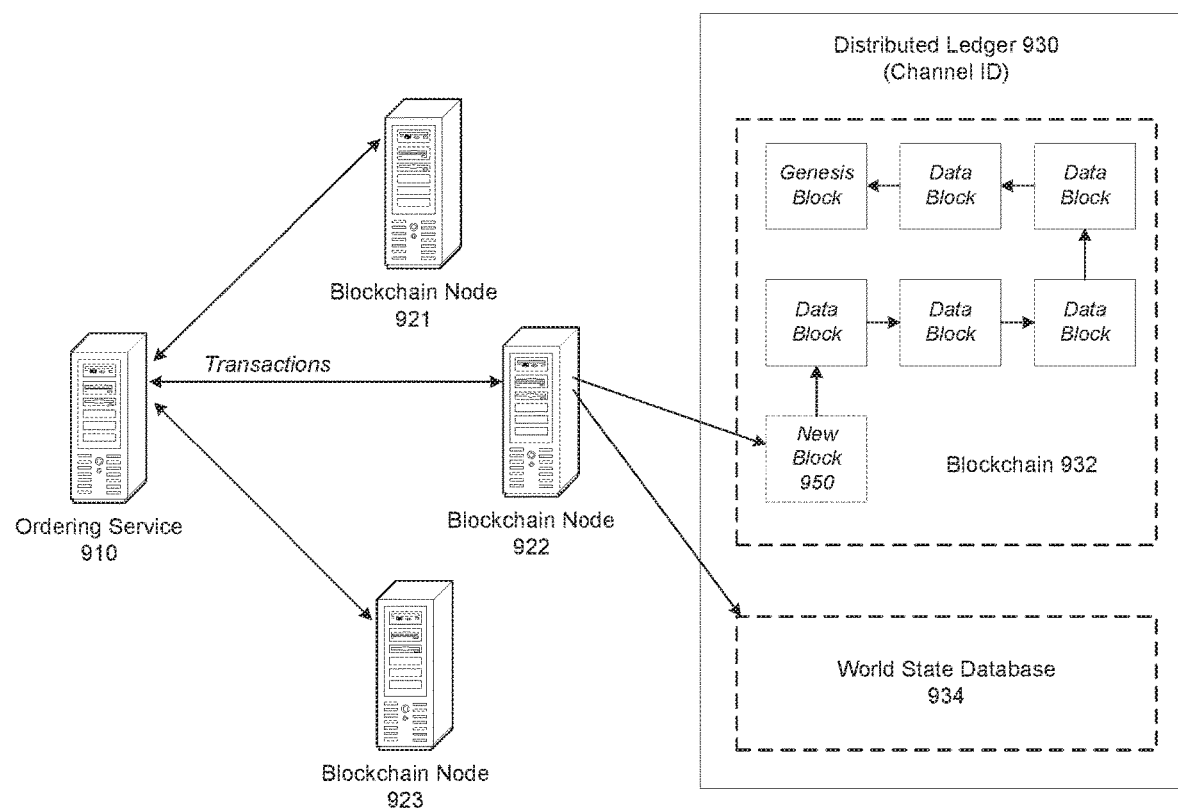
FIG. 9A illustrates an embodiment of a process to add a new block to a distributed ledger of a blockchain.
Figure 9B:
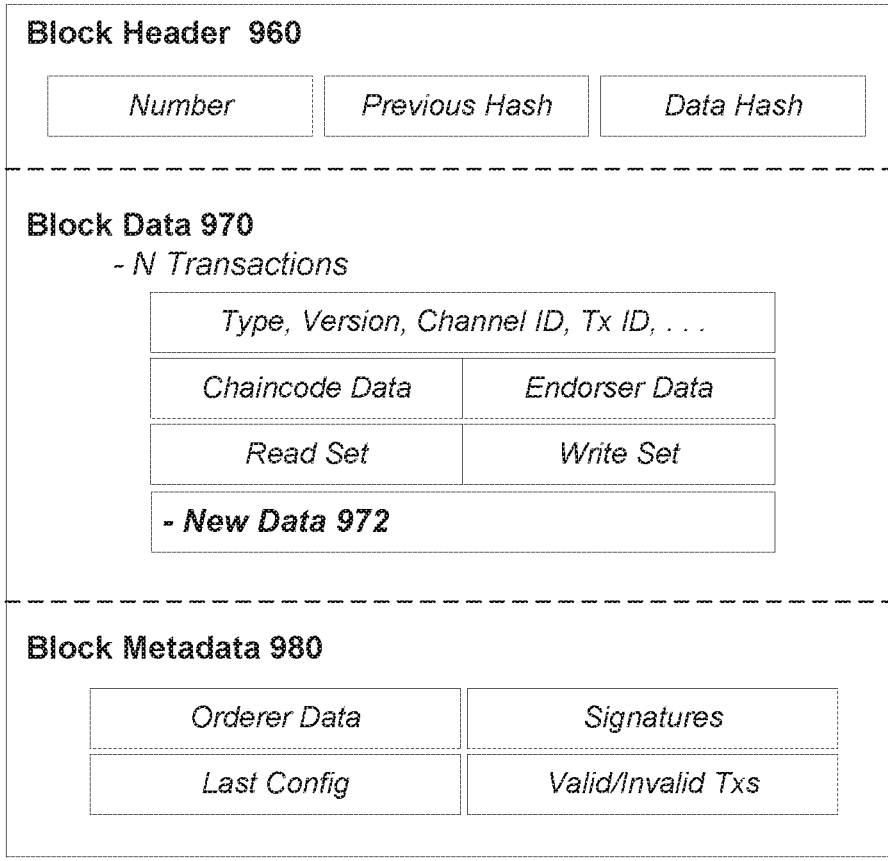
FIG. 9B illustrates an example of a block structure for the blockchain.

FIG. 9A illustrates an embodiment of a process 900 to add a new block to a distributed ledger 930 of the blockchain, and FIG. 9B illustrates an example of a block structure 950 for the blockchain.

Referring to FIG. 9A, clients may submit transactions to blockchain nodes 921, 922, and/or 923. Clients may be instructions received from any source to enact activity on the blockchain 930. As an example, clients may be applications that act on behalf of a requester, such as a device, person or entity to propose transactions for the blockchain. The plurality of blockchain peers (e.g., blockchain nodes 921, 922, and 923) may maintain a state of the blockchain network and a copy of the distributed ledger 930. Different types of blockchain nodes/peers may be present in the blockchain network including endorsing peers which simulate and endorse transactions proposed by clients and committing peers which verify endorsements, validate transactions, and commit transactions to the distributed ledger 930. In this example, the blockchain nodes 921, 922, and 923 may perform the role of endorser node, committer node, or both.

The distributed ledger 930 includes a blockchain 932 which stores immutable, sequenced records in blocks, and a state database 934 (current world state) maintaining a current state of the blockchain 932. One distributed ledger 930 may exist per channel and each peer maintains its own copy of the distributed ledger 930 for each channel of which they are a member. The blockchain 932 is a transaction log, structured as hash-linked blocks where each block contains a sequence of N transactions. Blocks may include various components such as illustrated in FIG. 9B. Linking of the blocks may be generated by adding a hash of the header of a previous block within the header of a current block. In this way, all transactions on the blockchain 932 are sequenced and cryptographically linked together preventing tampering with blockchain data without breaking the hash links. Furthermore, because of the links, the latest block in the blockchain 932 represents every transaction that has come before it. The blockchain 932 may be stored on a peer file system (local or attached storage), which supports an append-only blockchain workload.

The current state of the blockchain 932 and the distributed ledger 932 may be stored in the state database 934. The current state data may represent, for example, the latest values for all keys ever included in the chain transaction log of the blockchain 932. Chaincode invocations execute transactions against the current state in the state database 934. To make these chaincode interactions extremely efficient, the latest values of all keys are stored in the state database 934. The state database 934 may include an indexed view into the transaction log of the blockchain 932, it can therefore be regenerated from the chain at any time. The state database 934 may automatically get recovered (or generated if needed), for example, upon peer startup before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 910.

The ordering service 910 accepts endorsed transactions, orders them into a block, and delivers the blocks to the committing peers. For example, the ordering service 910 may initiate a new block when a threshold of transactions has been reached, a timer times out, or another condition. In the example of FIG. 9A, blockchain node 922 is a committing peer that has received a new data block 950 for storage on blockchain 930.

The ordering service 910 may be made up of a cluster of orderers. The ordering service 910 does not process transactions, smart contracts, or maintain the shared ledger. Rather, the ordering service 910 may accept the endorsed transactions and specifies the order in which those transactions are committed to the distributed ledger 930. The architecture of the blockchain network may be designed such that the specific implementation of 'ordering' (e.g., Solo, Kafka, BFT, etc.) becomes a pluggable component.

Transactions are written to the distributed ledger 930 in a consistent order. The order of transactions is established to ensure that the updates to the state database 934 are valid when they are committed to the network. In accordance with one or more embodiments, the parties of the distributed ledger 930 may choose the ordering mechanism that best suits that network.

When the ordering service 910 initializes a new block 950, the new block 950 may be broadcast to committing peers (e.g., blockchain nodes 921, 922, and 923). In response, each committing peer validates the transaction within the new block 950 by checking to make sure that the read set and the write set still match the current world state in the state database 934. Specifically, the committing peer can determine whether the read data that existed when the endorsers simulated the transaction is identical to the current world state in the state database 934. When the committing peer validates the transaction, the transaction is written to the blockchain 932 on the distributed ledger 930, and the state database 934 is updated with the write data from the read-write set. If a transaction fails, that is, if the committing peer finds that the read-write set does not match the current world state in the state database 934, the transaction ordered into a block will still be included in that block, but it will be marked as invalid, and the state database 934 will not be updated.

Referring to FIG. 9B, a block 950 (also referred to as a data block) that is stored on the blockchain 932 of the distributed ledger 930 may include multiple data segments such as a block header 960, block data 970, and block metadata 980. It should be appreciated that the various depicted blocks and their contents, such as block 950 and its contents, illustrated in FIG. 9B are merely for purposes of example and are not meant to limit the scope of the example embodiments. In some cases, both the block header 960 and the block metadata 980 may be smaller than the block data 970 which stores transaction data, however this is not a requirement. The block 950 may store transactional information of N transactions within the block data 970. The block 950 may also include a link to a previous block (e.g., on the blockchain 932 in FIG. 9A) within the block header 960. For example, the block header 960 may include a hash of the header of a previous block. The block header 960 may also include a unique block number, a hash of the block data 970 of the current block 950, and the like. The block number of the block 950 may be unique and assigned in an incremental/sequential order starting from zero. The first block in the blockchain may be referred to as a genesis block which includes information about the blockchain, its members, the data stored therein, etc.

The block data 970 may store transactional information of each transaction that is recorded within the block 950. For example, the transaction data may include one or more of a type of the transaction, a version, a timestamp, a channel ID of the distributed ledger 930, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 970 may also store data 972 which adds additional information to the hash-linked chain of blocks in the blockchain 932. Accordingly, the data 972 can be stored in an immutable log of blocks on the distributed ledger 930. Some of the benefits of storing such data 972 are reflected in the various embodiments disclosed and depicted herein.

The block metadata 980 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 910. Meanwhile, a committer of the block (such as blockchain node 922) may add validity/invalidity information based on an endorsement policy, verification of read/write sets, and the like. The transaction filter may include a byte array of a size equal to the number of transactions in the block data 970 and a validation code identifying whether a transaction was valid/invalid.

Figure 10:
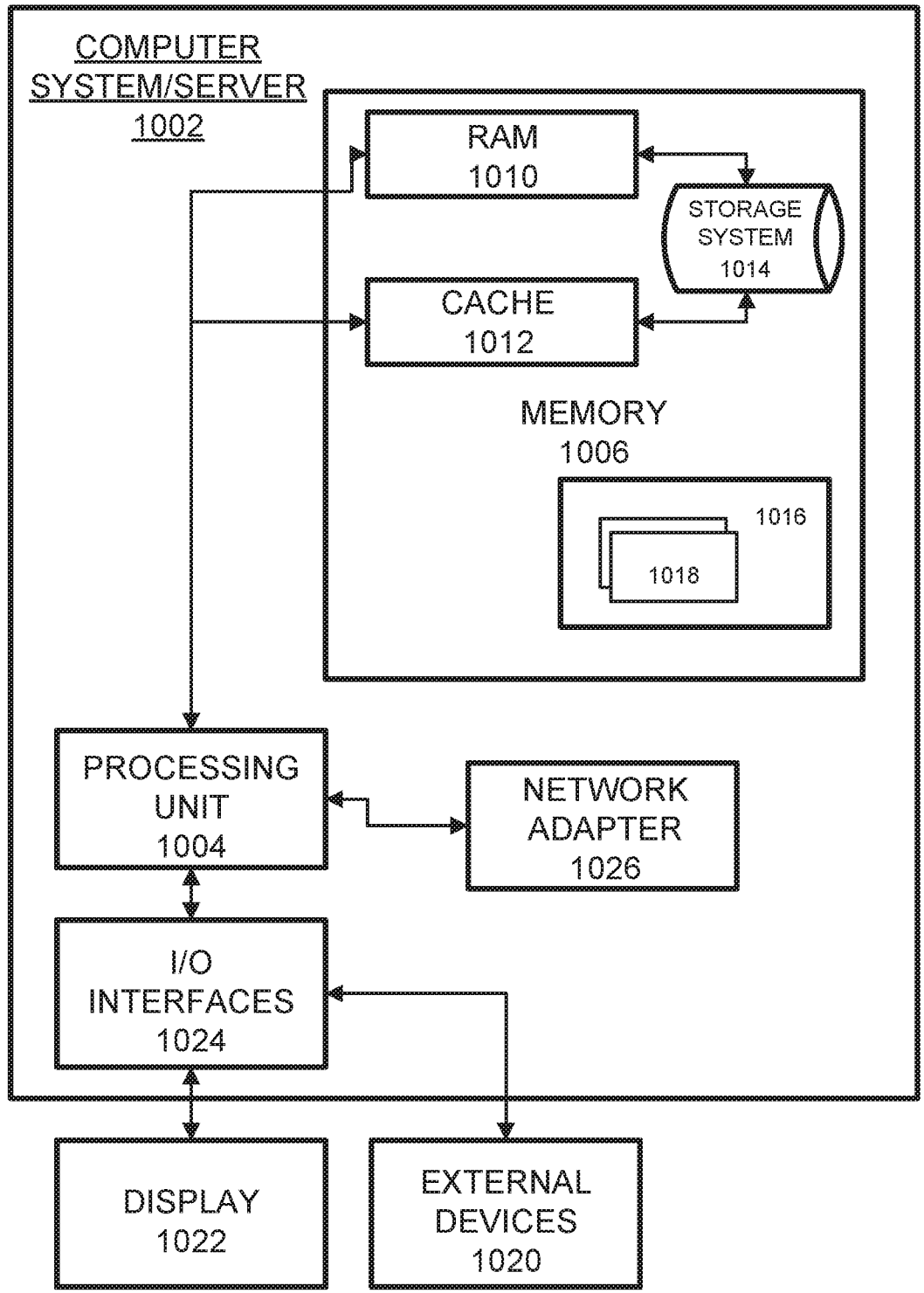
FIG. 10 illustrates an embodiment of a computing node.

FIG. 10 illustrates an embodiment of a computing node 1000 is capable of being implemented and/or performing any of the functionality set forth hereinabove. (The arrangement illustrated in FIG. 10 is not intended to suggest any limitation as to the scope of use or functionality of embodiments of the application described herein).

In computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As illustrated in FIG. 10, computer system/server 1002 in cloud computing node 1000 is shown in the form of a general-purpose computing device. The components of computer system/server 1002 may include, but are not limited to, one or more processors or processing units 1004, a system memory 1006, and a bus that couples various system components including system memory 1006 to processor 1004.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media. System memory 1006, in one embodiment, implements the flow diagrams of the other figures. The system memory 1006 can include computer system readable media in the form of volatile memory, such as random-access memory (RAM) 1010 and/or cache memory 1012. Computer system/server 1002 may further include other removable/non-removable, volatile/non-volatile computer system storage media.

By way of example only, storage system 1014 can be provided to read from and write to a non-removable, non-volatile magnetic media (not shown and typically called a "hard drive"). Although not shown, a magnetic disk drive to read from and write to a removable, non-volatile magnetic disk (e.g., a "floppy disk"), and an optical disk drive to read from or writing to a removable, non-volatile optical disk such as a CD-ROM, DVD-ROM or other optical media can be provided. In such instances, each can be connected to the bus by one or more data media interfaces. As will be further depicted and described below, memory 1006 may include one or more program products having a set of (e.g., one or more) program modules that are configured to carry out the functions of various embodiments of the application.

Program/utility 1016, having a set of (one or more) program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The foregoing embodiments may be applied to generate, manage, and track a blockchain of digital content, as described below.

Digital Content Blockchain

Figure 11A:
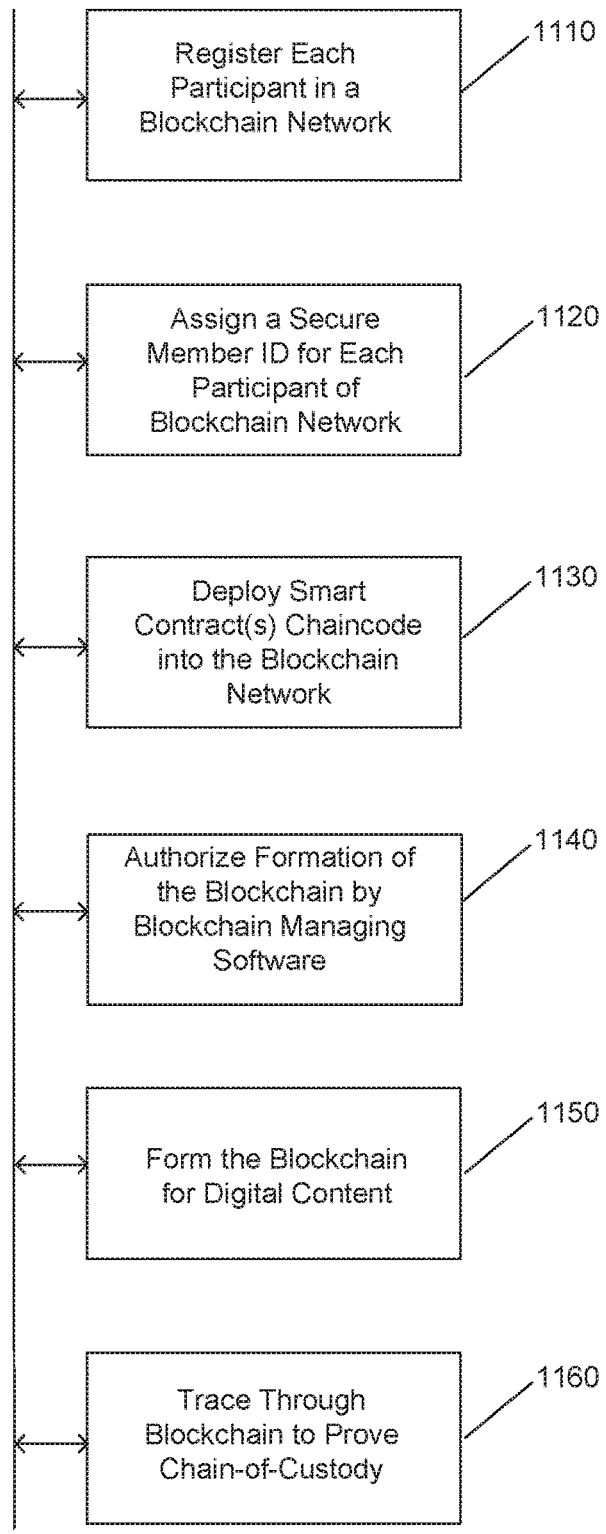
FIG. 11A illustrates an embodiment of a method to generate and manage a blockchain of digital content for purposes of establishing an immutable chain-of-custody.

FIG. 11A illustrates operations included in a method which may be performed to generate, manage, and track a blockchain of digital content for purposes of establishing an immutable chain-of-custody for the content 1100. The method includes, at 1110, registering each of a plurality of participants in a blockchain network, e.g., as previously illustrated, and then, at 1120, assigning secure member IDs to the participants.

At 1130, smart contract chaincode is deployed into the blockchain network to define what actions (e.g., transactions) each participant is allowed to perform on the digital content. The chaincode for the smart contract may be encrypted and executed each time the digital content is processed in any manner by a participant. Any violation of the rules of the Smart contract results in failure of an attempted transaction. At this point, the digital content associated with the attempted translation is considered outside the chain-of-custody and void as far as legal use.

At 1140, a new blockchain for the digital content is authorized by the blockchain manager, which, for example, may be the managing software of the blockchain, a smart contract for the blockchain, or network personnel.

At 1150, the blockchain for the digital content is generated based on a version of the video file, data received from one or more participants, and various generated values including computed tracking values for each block in the blockchain, as described in greater detail below.

At 1160, a participant may trace through the entire blockchain based on the tracking values in the block to prove a chain-of-custody for the digital content. Examples of the blockchain will now be described.

Figure 11B:
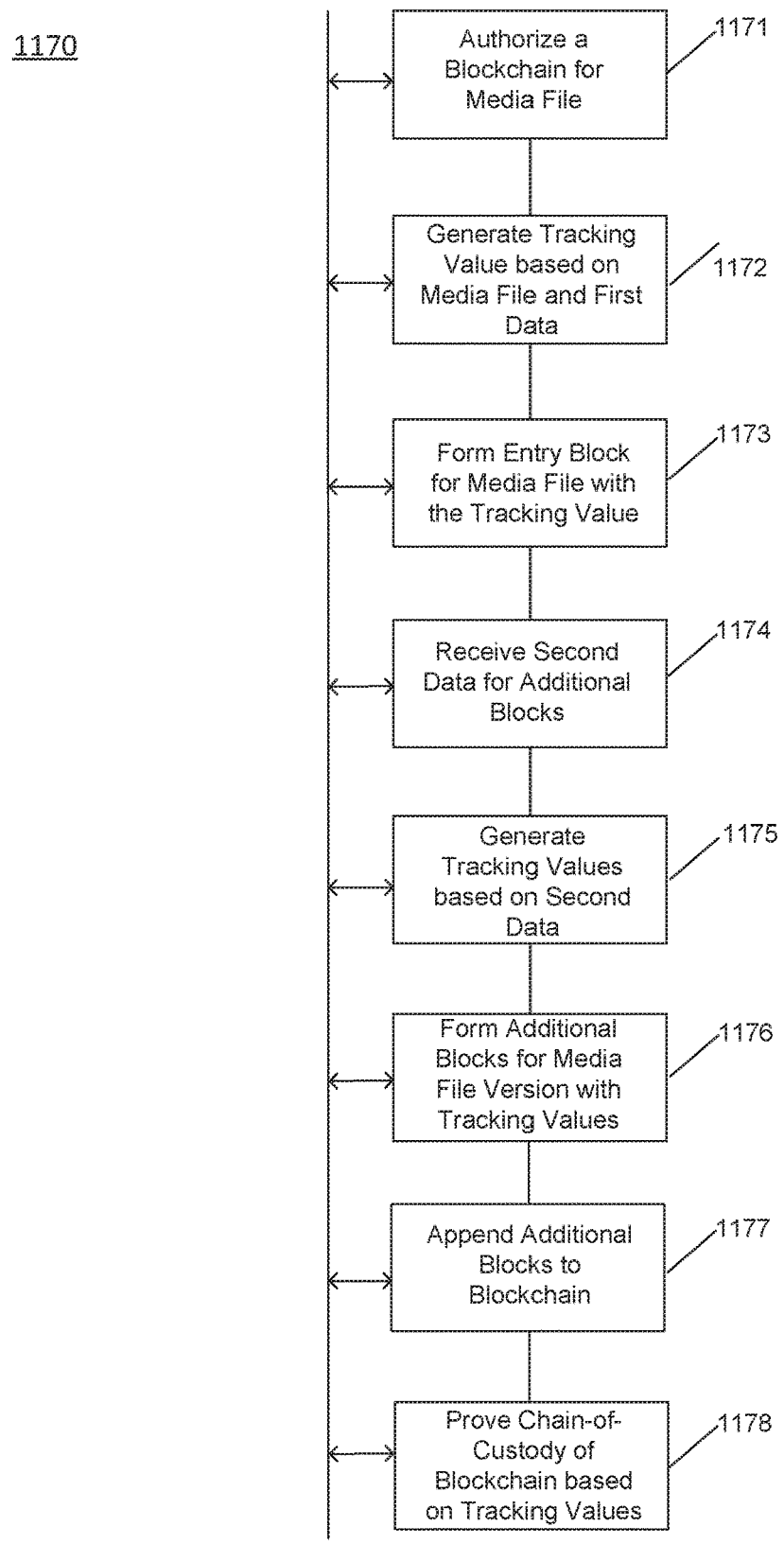
FIG. 11B illustrates an embodiment of a method to form the blocks of and track through the blockchain.

FIG. 11B illustrated operations that may be included in an embodiment of a method to form the blocks of and track through the blockchain 1170, as indicated in 1150 and 1160 of FIG. 11A. Referring to FIG. 11B, the blockchain may be generated, first, by authorizing a blockchain for the video file at 1171. A first tracking value is then generated based on first data and the video file received from a blockchain participant, at 1172. The first data may be indicative of various characteristics or attributes of the video file, as described in greater detail herein. An entry block is then formed to include first tracking value and to include or reference the video file, at 1173. The entry block may be a genesis block including or referencing the original video file or may be a new appended block in the blockchain including or referencing data and/or changes performed relative to the original video file. In this latter case, the blockchain may, for example, reference n−1 versions of the original video file (e.g., which may be the original video file itself or a processed version of that file). For illustrative purposes, the genesis block is discussed as the entry block with the full understanding that the entry block may be a new or initial block different from the genesis block in other embodiments, as described above.

In one embodiment, the genesis block may include a hash value for the video file (which may or may not include the actual video file itself, e.g., the video file may be stored in the blockchain or the blockchain may store a hash value which may be used as a basis for accessing the video file stored at another storage area or memory address).

Subsequently, second data is received for each of a number of additional blocks in the blockchain, at 1174 The second data is received from one or more participants of the blockchain. The second data may be data received for just one additional block or for a number of respective additional blocks to be included in the blockchain. Corresponding second tracking values are generated based on the second data of the number of additional blocks, at 1175. The additional blocks are then formed to include the second tracking values, respectively, at 1176. The additional blocks are appended to the genesis block, at 1177. Once a block is appended, no changes may be made to the block thereafter.

The number of additional blocks are cryptographically linked in an ordered sequence to the genesis block. Each of the additional blocks may include a version of the video file which corresponds to an original version of the video file as set forth in the genesis block or a processed version of the video file. In one embodiment, each of the additional blocks may include a hash value for the version of the video file (and not the version of the video file itself), which is stored at another storage area or memory address. The second data in each of the additional blocks is indicative of processing performed on the version of the video file in that block. At any point during this method, the current block may serve as the entry point for appending blocks referencing, for example, processed versions of the video file. At 1178, an operation is performed to trace through the blockchain based on the first and second tracking values to confirm or prove an auditable and immutable chain-of-custody of the video file.

Figure 12:
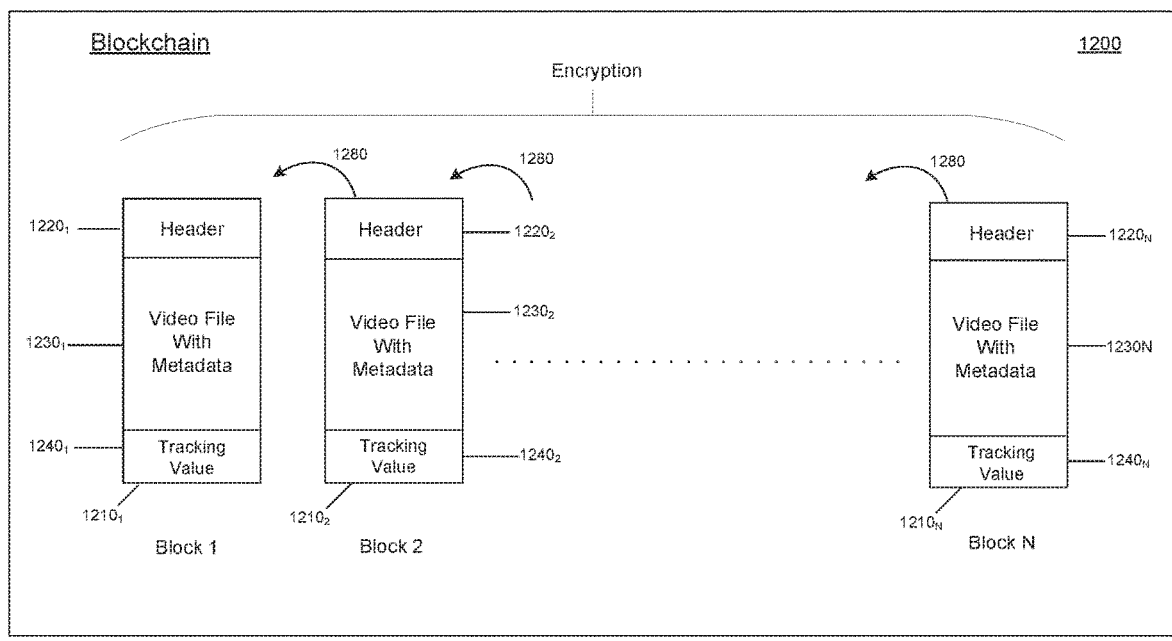
FIG. 12 illustrates an embodiment of a blockchain for digital content.

FIG. 12 illustrates an embodiment of a blockchain 1200 for digital content which may be formed, managed, and tracked in accordance with the embodiments described herein. The digital content may include one or more media files and associated information. The media files may contain images, video, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, tracking value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original video file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| Block N Hash Value | Block N Hash Value ... Content |

In the example embodiment of FIG. 12, the blockchain 1200 includes a number of blocks $1210_1$, $1210_2$, ... $1210_N$ cryptographically linked in an ordered sequence, where N≥1. The encryption used to link the blocks $1210_1$, $1210_2$, ... $1210_N$ may be any of a number of keyed or un-keyed Hash functions. In one embodiment, the blocks $1210_1$, $1210_2$, ... $1210_N$ are subject to a hash function which produces n-bit alphanumeric outputs (where n is 256 or another number) from inputs that are based on information in the blocks. Examples of such a hash function include, but are not limited to, an SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $1210_1$, $1210_2$, ..., $1210_N$ may be cryptographically linked by a function that is different from a hash function. For purposes of illustration, the following description is made with reference to a hash function, e.g., SHA-2.

Each of the blocks $1210_1$, $1210_2$, ..., $1210_N$ in the blockchain includes a header, a version of the media file, and a tracking value. The header and the tracking value are different for each block as a result of hashing in the blockchain. In one embodiment, the tracking value may be included in the header. As described in greater detail below, the version of the media file may be the original media file or a different version of the original media file. For purposes of illustration, the case where the media file is a video file will be discussed.

The first block $1210_1$ in the blockchain is referred to as the genesis block and includes the header $1220_1$, original video file $1230_1$, and an initial tracking value $1240_1$. The hashing scheme used for the genesis block, and indeed in all subsequent blocks, may vary. For example, all the information in the first block $1210_1$ may be hashed together and at one time, or each or a portion of the information in the first block $1210_1$ may be separately hashed and then a hash of the separately hashed portions may be performed.

The header $1220_1$ may include one or more initial parameters, which, for example, may include a version number, timestamp, nonce, root information, difficulty level, consensus protocol, duration, media format, source, descriptive keywords, and/or other information associated with original video file $1230_1$ and/or the blockchain. The header $1220_1$ may be generated automatically (e.g., by blockchain network managing software) or manually by a blockchain participant. Unlike the header in other blocks $1210_2$ to $1210_N$ in the blockchain, the header $1220_1$ in the genesis block does not reference a previous block, simply because there is no previous block.

The original video file $1230_1$ in the genesis block may be, for example, video as captured by a camera (e.g., a body-worn camera) with or without processing prior to its inclusion in the blockchain. The original video file $1230_1$ is received through the interface of the system from the camera, media source, or node. The original video file $1230_1$ is associated with metadata, which, for example, may be generated by a user, the camera, and/or the system processor, either manually or automatically. The metadata may be included in the first block $1210_1$ in association with the original video file $1230_1$.

The tracking value $1240_1$ in the genesis block is an initial tracking value generated based on one or more unique attributes of the original video file $1230_1$. In one embodiment, the one or more unique attributes may include the hash value for the original video file $1230_1$, metadata for the original video file $1230_1$, and other information associated with file. In one implementation, the initial tracking value $1240_1$ may be based on the following unique attributes:
1) SHA-2 computed hash value for the original video file
2) originating camera device ID
3) starting timestamp for the original video file
4) initial storage location of the original video file
5) blockchain network member ID for software to currently control the original video file and associated metadata The other blocks $1210_2$ to $1210_N$ in the blockchain also have headers, video files, and tracking values. However, unlike the first block $1220_1$, each of the headers $1220_2$ to $1220_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original video file) on a block-by-block basis, as indicated by arrows 1280, to establish an auditable and immutable chain-of-custody.

Each of the header $1220_2$ to $1220_N$ in the other blocks may also include other information, e.g., version number, timestamp, nonce, root information, difficulty level, consensus protocol, and/or other parameters or information associated with the corresponding video files and/or the blockchain in general.

The video files $1230_2$ to $1230_N$ in the other blocks may be equal to the original video file or may be a modified version of the original video file in the genesis block depending, for example, on the type of processing performed. The type of processing performed may vary from block to block. The processing may involve, for example, any modification of a video file in a preceding block, such as redacting information or otherwise changing the content of, taking information away from, or adding or appending information to the video files.

Additionally, or alternatively, the processing may involve merely copying the video file from a preceding block, changing a storage location of the video file, analyzing the video file from one or more preceding blocks, moving the video file from one storage or memory location to another, or performing action relative to the video file of the blockchain and/or its associated metadata. Processing which involves analyzing a video file may include, for example, appending, including, or otherwise associating various analytics, statistics, or other information associated with the video file.

The tracking values in each of the other blocks $1240_2$ to $1240_N$ in the other blocks are unique values and are all different as a result of the processing performed. For example, the tracking value in any one block corresponds to an updated version of the tracking value in the previous block. The update is reflected in the hash of the block to which the tracking value is assigned. The tracking values of the blocks therefore provide an indication of what processing was performed in the blocks and also permit a tracing through the blockchain back to the original video file. This tracking confirms the chain-of-custody of the video file throughout the entire blockchain.

For example, consider the case where portions of the video file in a previous block are redacted, blocked out, or pixelated in order to protect the identity of a person shown in the video file. In this case, the block including the redacted video file will include metadata associated with the redacted video file, e.g., how the redaction was performed, who performed the redaction, timestamps where the redaction(s) occurred, etc. The metadata may be hashed to form the tracking value. Because the metadata for the block is different from the information that was hashed to form the tracking value in the previous block, the tracking values are different from one another and may be recovered when decrypted.

Figure 13:
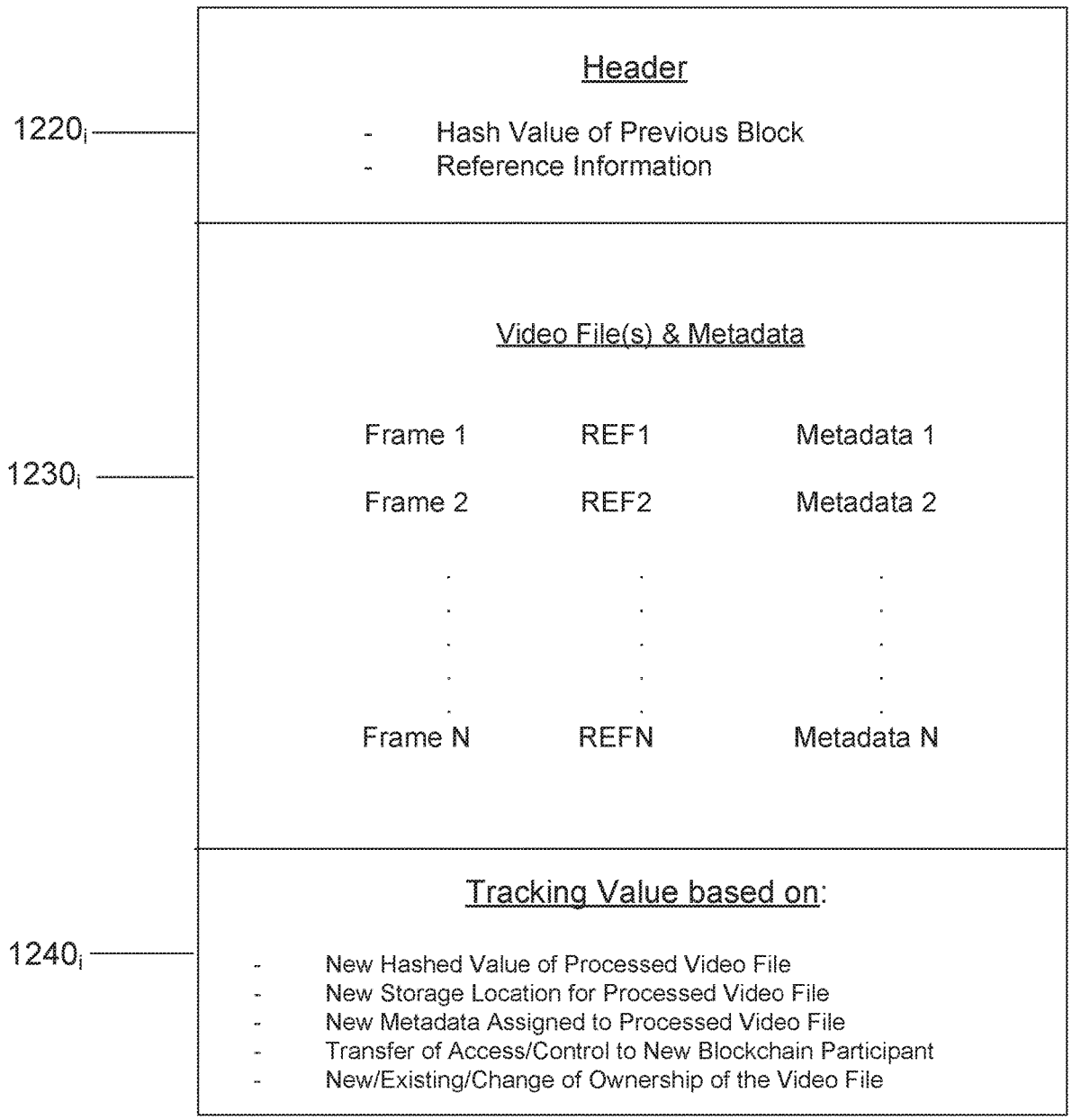
FIG. 13 illustrates an embodiment of the structure of a block in the blockchain.

In one embodiment, the tracking value of a previous block may be updated (e.g., a new hash value computed) to form the tracking value of a current block when any one or more of the following occurs. The new hash value may be computed by hashing all or a portion of the information noted below, in this example embodiment.
 a) new SHA-2 computed hash value if the video file has been processed in any way (e.g., if the video was redacted, copied, altered, accessed, or some other action was taken)
 b) new storage location for the video file
 c) new metadata identified associated with the video file
 d) transfer of access or control of the video file from one blockchain participant to another blockchain participant
 e) UMID identifier FIG. 13 illustrates an embodiment of a $Block_i$ which may represent the structure of the blocks in the blockchain 1300 in accordance with one embodiment. The $Block_i$ includes a header $1220_i$, a video file $1230_i$, and a tracking value $1240_i$.

The header 1220i includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the video file and metadata.

The video file 1230i includes a plurality of frames Frame 1, Frame 2, . . . , Frame N in sequence. The frames are tagged with metadata Metadata 1, Metadata 2, . . . , Metadata N which describe the content and/or characteristics associated with the frames. For example, the metadata for each frame may include information to indicate a timestamp for the frame, process the frame, keywords indicating the persons or other content depicted in the frame, and/or other features that may be helpful to establish the validity and content of the video file as a whole, and particularly its use a digital evidence, for example, as described in connection with an embodiment discussed below. In addition to the metadata, each frame may be tagged with reference $REF_1$, $REF_2, \ldots, REF_N$ to a previous frame to prevent tampering, gaps in the video file, and sequential reference through the video file.

Once the metadata is assigned to the frames (e.g., through a smart contract), the metadata cannot be altered without the hash changing, which can easily be identified for invalidation. The metadata, thus, creates a frame-by-frame log of information that may be accessed for use by participants in the blockchain.

The tracking value $1240_i$ includes a value (e.g., hash value or other value) computed based on any of the types of information previously discussed. For example, for any given block $Block_i$, the tracking value for that block may be updated to reflect the processing that was performed for that block, e.g., new hash value, new storage location, new metadata for the associated video file, transfer of control or access, identifier, or other action or information to be added. Although the tracking value in each block is shown to be separate from the metadata for the frames of the video file and header, the tracking value may be based, in part or whole, on this metadata in another embodiment.

Once the blockchain 1200 is formed, at any point in time, the immutable chain-of-custody for the video file may be obtained (e.g., to make the video file admissible as evidence in court or other proceeding) by querying the blockchain for the transaction history of the tracking values across the blocks. This query, or tracking procedure, may begin with decrypting the tracking value of the block that is most currently included (e.g., the last ($N^{th}$) block), and then continuing to decrypt the tracking value of the other blocks until the genesis block is reached and the original video file is recovered. The decryption may involve decrypting the headers and video files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the video file of the blockchain.

Figure 14:
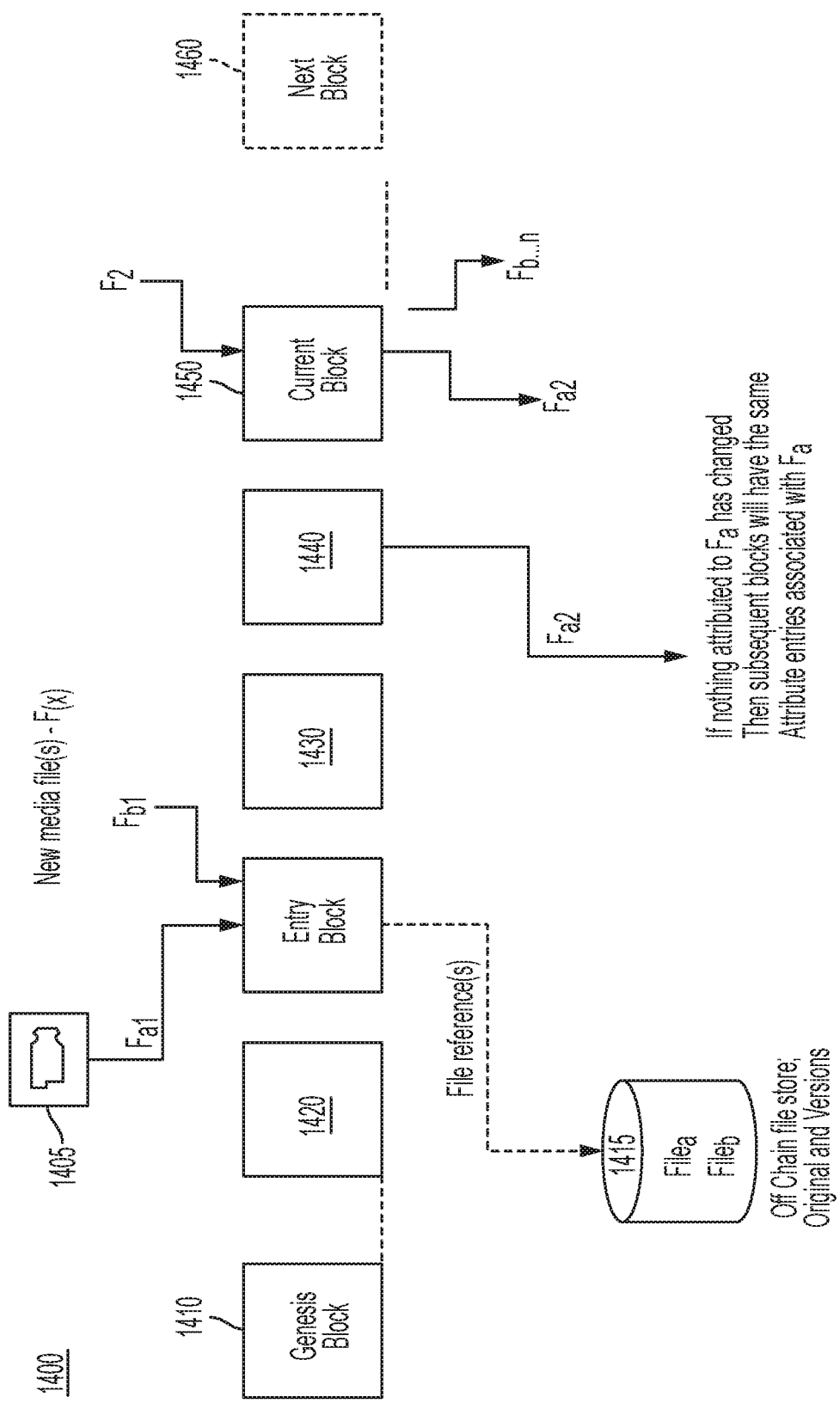
FIG. 14 illustrates a blockchain generated by another method embodiment.

FIG. 14 shows an embodiment of a blockchain 1400 for a media file generated in accordance with a variation of the method previously described. In this variation, the genesis block is different from the entry block.

Referring to FIG. 14, the blockchain 1400 includes a genesis block 1410 which includes or references an original media file. The genesis block 1410 also includes a tracking value and header, for example, as previously indicated. The media file may include one type of media or a combination of different types of media.

In an initial operation, the method includes appending an entry block 1420 to the genesis block 1410 (or one or more blocks which have already been appended to the genesis block 1410). When the entry block 1420 is appended directly to the genesis block 1410, the method may be considered to append n–1 blocks to the genesis block, where n>1. In one case, the entry block 1420 may reference the original media file or a processed version of the media file stored in an off-chain storage area 1415, e.g., stored in a database, memory, or some other storage device. In one case, the media file originates from a camera 1405 which captures an original video file $Fa_1$. In another case, the entry block 1420 may reference a processed version $Fb_1$ of the media file. The entry block 1420 also includes a tracking value and header, for example, as previously described.

The method continues by appending subsequent blocks 1430-1450 to the entry block 1420. The current block 1450 is shown to be the latest block appended to the blockchain and represents, for example, a latest processed version $F_2$ of the media file. As shown, for the block 1440, if no changes have been made to the video file, then block 1440, and indeed any of the subsequent blocks where no changes have been made to the video file, may have the same attribute entries associated with a previous block or the entry block. When a change is made to the video file or processing is performed, the corresponding block may include new attribute entries (e.g., new tracking value, header, metadata, etc.) and may reference the processed video file in the off-chain storage area.

In one embodiment, a new media file $F_2$ may be referenced in one or more of the appended blocks (e.g., block 1450). The new media file $F_2$ may be a processed version of the original media file or additional media information (video, text, etc.) that is added to the original media file or that is otherwise associated with any of the media files referenced by the blockchain. Such a block 1450 has associated header, metadata, tracking values, and/or other attribute entries $Fa_2$ and $F_{b \ldots n}$. The method may continue by adding even more subsequent blocks 1460. In one embodiment, the blocks in the blockchain may reference multiple video files.

Digital Evidence

Body-Worn Camera Video Blockchain

The blockchain described herein may be used to provide an auditable and immutable chain-of-custody of digital evidence that is admissible in a court or administrative proceeding or which may be provided in response to a Freedom of Information Act (FOIA) request or other setting where proof is sought or required.

The blockchain may be formed, managed, and used by a flexible system, method, and computer-readable medium storing instructions which track the flow of processing of the digital evidence and associated metadata, as it is transferred through various stages and different tools used in the processing pipeline. The tracking system and method serve as an auditable source of proof that the video and metadata have not been tampered with by unauthorized entities at any point along the processing pipeline. (Such unauthorized entities may include, but are not limited to, users or tools not authorized as a participant in the blockchain as determined, for example, by one or more smart contracts.) The tracking system and method, thus, may allow the digital evidence in the blockchain to be traced all the way back through the processing stages (and their associated blocks) to the original source of the evidence.

In one embodiment, the digital evidence may be in the form of video from a camera used by credentialed entity, or security personnel. The camera may be, for example, a body-worn camera, a drone camera, or a camera mounted on a vehicle, building, or other location. In another embodiment, the digital evidence may be information derived from a digital media evidence management system (MEMS) sensor used by credentialed individual, fire, security, or other personnel which, for example, may serve as evidence. In the following description, a body-worn camera embodiment will be discussed for illustration purposes.

Video data captured by body-worn camera devices worn by credentialed entity officers may be a crucial piece of evidence. This type of evidence often depicts innocent bystanders and thus must be altered in order to protect their identities. The altered video, however, is not eligible to be used as evidence unless a clear "chain of custody" can be proven from the original video file in the device through the entire chain of processing that the video undergoes.

Any chain-of-custody solution for such credentialed entity video evidence data must meet requirements for auditability and immutability, and must be able to demonstrate clear provenance all the way back to the device on which the original images were captured. Without this immutable chain-of-custody system, the evidence can be thrown out during trial or investigation.

Figure 15:
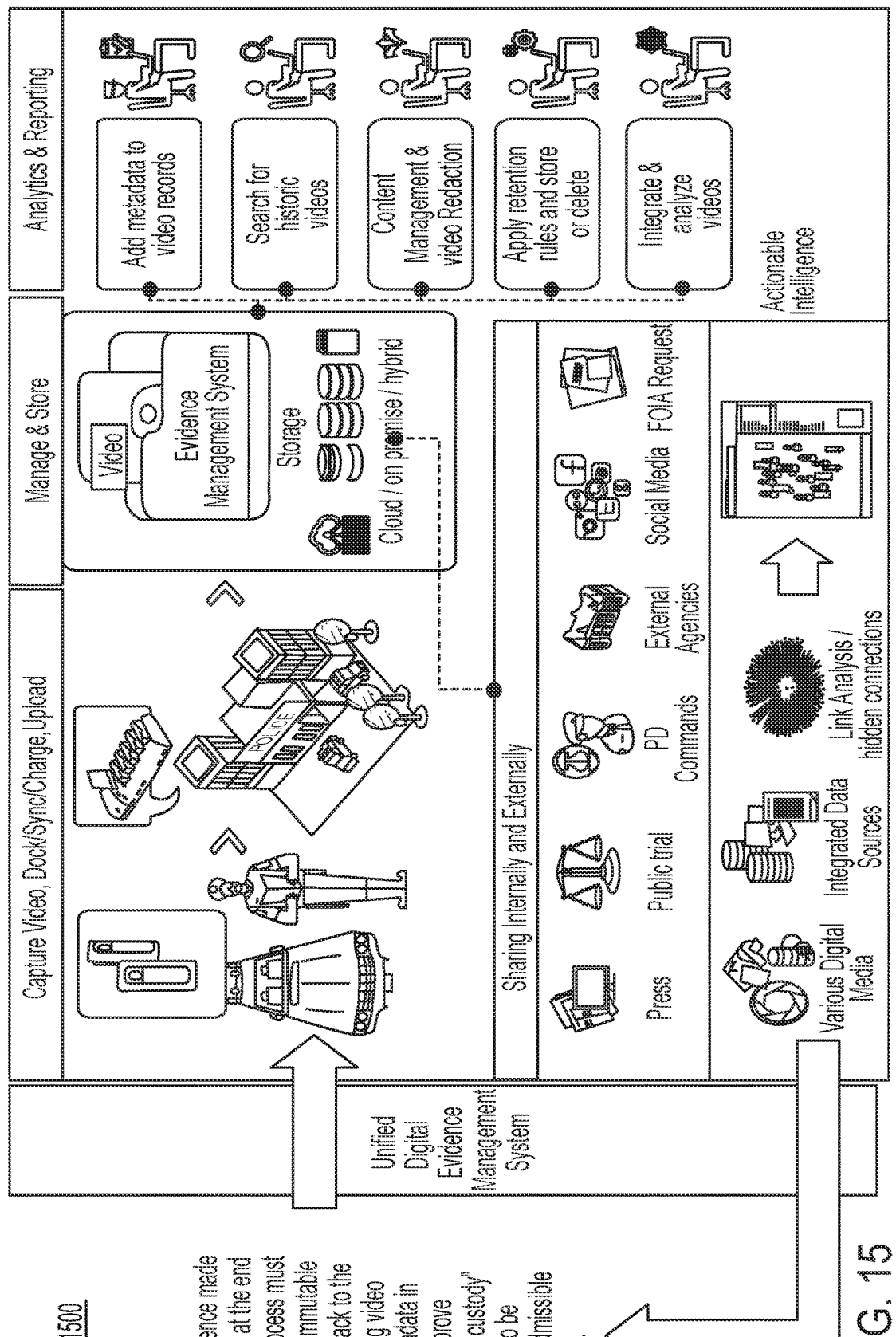
FIG. 15 illustrates an embodiment of a video and digital evidence management process.

FIG. 15 illustrates an example of a video and digital management process 1500 in accordance with one implementation. In this example, the process is implemented within a unified digital management system which initially includes a Capture Video, Dock/Sync/Charge and Upload stage. In this stage, an individual obtains video with a camera that may serve as proof for an action. The video is then uploaded to the system in the Upload stage to form the genesis block with information about initial upload, individual's name, etc. The system then adds subsequent blocks for each additional part of the process, as long as the conditions in the smart contract are met.

For example, in a subsequent stage entitled Manage & Store, the video is downloaded to a computer system in a credentialed entity. The computer system may include or have access to an Evidence Management System connected to an on-site and/or cloud storage system, or a hybrid thereof. The stored video may be made available to blockchain participants (as determined by one or more smart contracts) at an Analytics & Reporting stage. In this stage, a blockchain for the video is generated in accordance with the embodiments described herein. In forming the blockchain, metadata is added to the video file. In this example, metadata is added to the header and/or each of the video frames in forming a genesis block of the blockchain. A tracking value may also be computed and added to the genesis block as previously described, along with hashing.

After the genesis block is formed, subsequent blocks may be appended in the blockchain based on processing performed in connection with the video file. For example, as shown in the Analytics & Reporting stage, the video file protected by the blockchain may be accessed by a blockchain participant. The mere accessing of the video file may create a block that is to be appended in the blockchain. Reference information, metadata, and an updated tracking value may be computed to indicate, for example, the identity of the accessing participant, what frames of the video file were viewed, whether a copy was made of the video file, whether the video file was copied or stored in a new location, etc.

Another type of processing involves altering the video file. For example, in order to protect the identity of innocent third parties, portions of the video file may be redacted, blocked, pixelated, or otherwise obscured. Other portions considered to be pertinent evidence may be left unaltered. Reference information, metadata, and an updated tracking value may be computed to indicate reflect these changes and other characteristics and attributes associated with the change.

Another type of processing involves integrating or analyzing the video file. This may involve, for example, adding analytics or other information. Blocks may be appended in the blockchain with updated tracking values to reflect this processing. Additionally, retention rules may be applied and the content in one or more blocks may be stored or deleted and associated blocks may be appended in the blockchain, once again with updated tracking values. The retention rules may be determined, for example, in accordance with one or more smart contracts. Another type of processing involves moving or changing a storage location of the file.

The video stored in the Evidence Management System may also be shared with internal or external entities, including but not limited to the press, public trial, credentialed entity command and other personnel, external agencies, social media, and FOIA requesters. Additional blocks may or may not be appended to the blockchain to reflect the sharing of this information. The evidence represented in the blockchain may then be stored on various portable digital media or made available on one or more integrated data sources. A link analysis and hidden connections evaluation may also be performed. The data may be made available to various types of actionable intelligence, with our without appropriate updates to the blockchain.

Through the tracking values, metadata, and/or other information in the blockchain, the video file evidence made available at the end of this process establishes an immutable linkage back to the original video file and its associated metadata in the genesis block, to thereby provide a "chain of custody" that will allow the video file in the genesis block or any subsequent block in the chain to be admissible in court as evidence.

Figure 16:
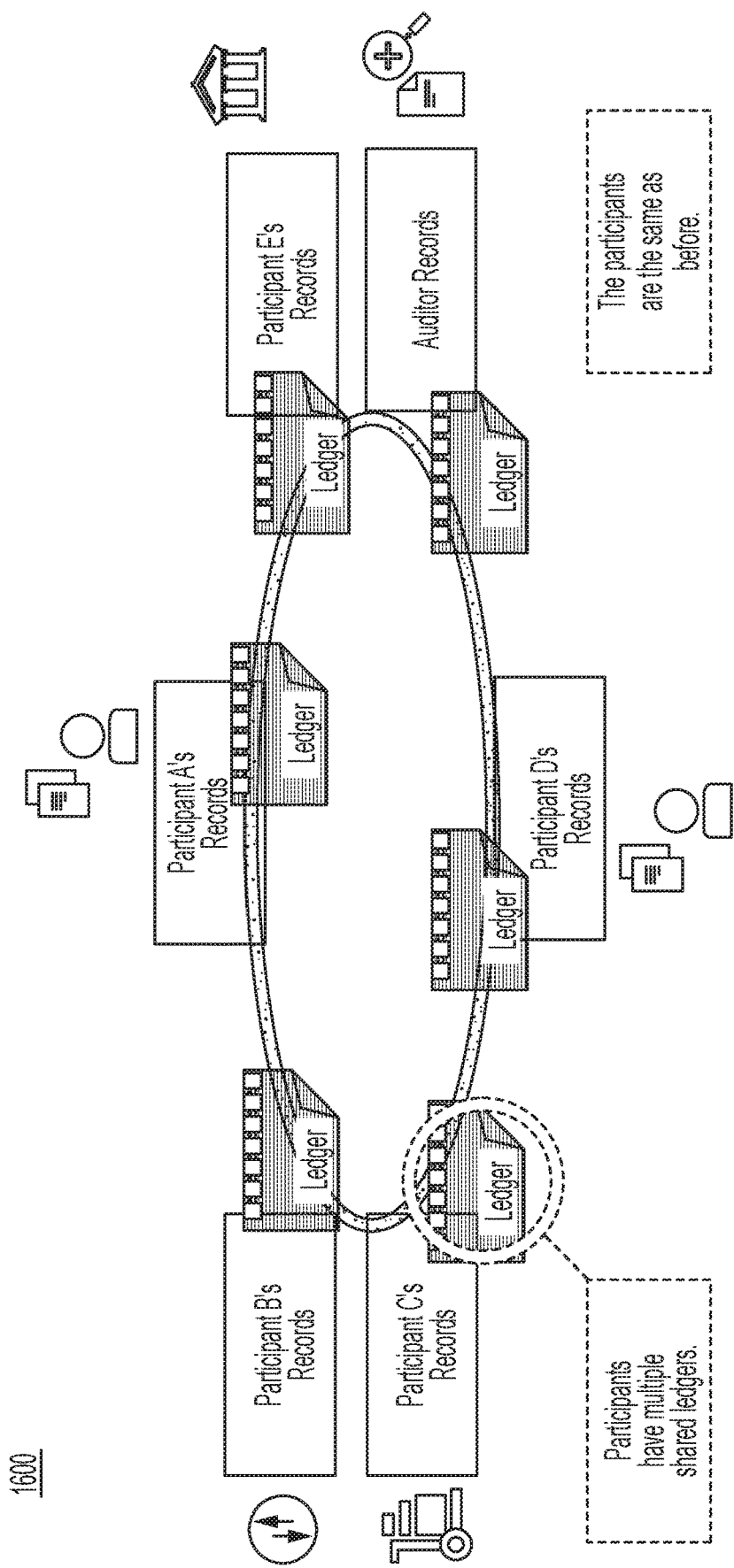
FIG. 16 illustrates an embodiment of a blockchain network.

FIG. 16 illustrates an example of a network 1600 which may be used to generate the secured, permissioned blockchain. The network 1600 may correspond to any of the blockchain network embodiments described herein. In this example, the network 1600 includes a plurality of blockchain participants A, B, C, D, and E which have been authenticated through one or more smart contracts. As previously indicated, the participant may be the user or the computer or software of a user. Each participant may include a memory or storage device to store records, including a copy of a shared ledger for the blockchain and the blockchain itself. In one embodiment, the participants may have local or temporary ledgers, which may store processing changes of the video file before it is endorsed and approved through consensus. Once there is endorsement and consensus, the blockchain may be appended with a new block to reflect the processing change and the shared ledger may be updated accordingly for storage on all participant computers in the network.

Figure 17:
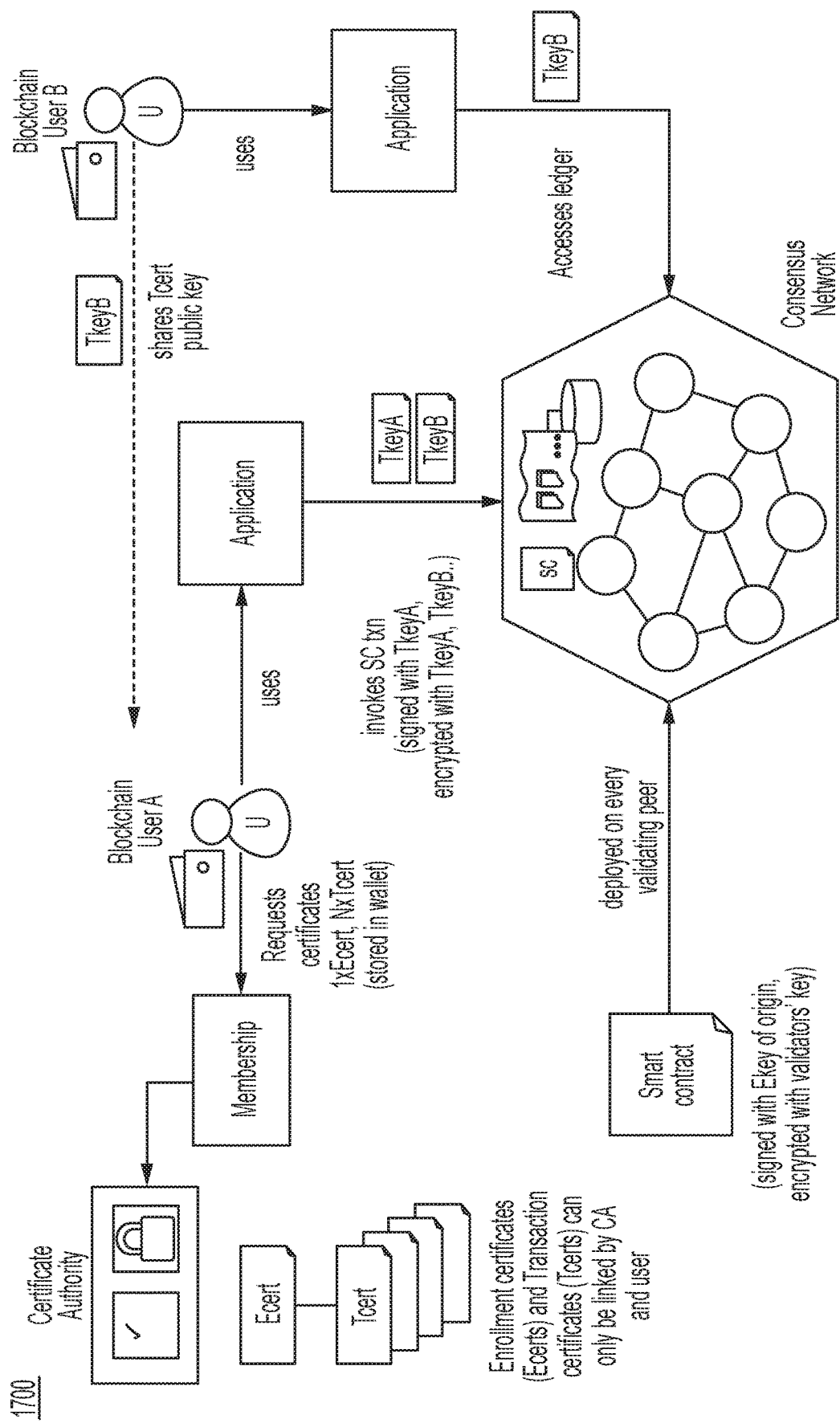
FIG. 17 illustrates an embodiment to enroll new participants for a blockchain network.

FIG. 17 illustrates an embodiment to enroll new participants for permissioned ledger access 1700 to the blockchain network. The network may include a plurality of participants (or participant devices) connection in a predetermined manner, e.g., peer-to-peer connections. In this example, User A and User B are registered and enrolled as participants for blockchain network membership services. A "participant" may be any program, computer, or user that will interact with the digital evidence (in this case the body-worn camera video plus associated metadata). User A and User B may be non-validating peers functioning as a proxy to validating peers, or may themselves be validating peers.

In an initial operation, User A requests an enrollment certificate (Ecert) and a transaction certificate (Tcert) for membership to the network. These certificates may only be linked by the certificate authority (CA) and the user. User B requests a shared transaction certificate (shared Tcert) with a public key and an enrollment certificate. Both users may store the certificates, for example, in respective digital wallets, as secure member identifications (IDs) or separate information may serve as the secure member ID.

After the users have been enrolled, each user processes the video file of the blockchain using respective applications. The blockchain is stored in the blockchain network, labeled a consensus network because a consensus of one or more blockchain participants (e.g., validating peers) must be obtained (as determined by blockchain network managing software or a smart contract) before a block can be appended to the blockchain and the shared ledger is updated. The network may include software tools participating in the processing of the video file. The network may be established by each participant tool obtaining an Enrollment certificate via API call, and then invoking the Register API in order to join the network.

User A processes the video file using a corresponding application. When the processed video file is validated and a consensus is obtained (as determined by a smart contract signed with an Ekey or origin, encrypted with a validator's key), the processed video file is hashed or otherwise encrypted using two transaction keys, namely TkeyA and TkeyB, which may be public keys, private keys, or a public key-private key pair. A corresponding block is then appended to the blockchain and the ledger is updated accordingly to preserve accurate chain-of-custody. User B may access the ledger of the blockchain using a corresponding application, based on a key TkeyB, which may be a public or private key.

Each smart contract of the blockchain network may be verified, signed, and encoded in a programming language, and may include chaincode setting forth rules to define what operations and actions are allowed to be performed in the network and/or what each participant in the network is allowed to perform in relation to the video file. A smart contract may be formed from embedded logic that encodes the rules which are stored in or may be accessed by each participant device. Developers write chaincode applications and deploy them to the network. Participant end users then invoke the chaincode, for example, through a client-side application that interfaces with a network peer or node.

In one embodiment, the rules of the smart contract may control authentication of each participant or user as a condition to allowing access to the video file. The rules of the smart contract may also control the flow and level of processing each participant may perform. For example, the chaincode may give higher levels of processing (or actions) permission to some participants than others. The chaincode may also allow some participants, for example, in the Analytics & Reporting stage of FIG. 15, to add metadata to the video file (and/or frames of the video file), while other participants may be restricted from performing this type of processing. The chaincode may also control:

- the types and scope of processing that can be performed in generating and appending blocks to the blockchain along with its associated content (e.g., metadata, tracking value, etc.
- what participants are allowed to search for historic records of video files stored in the network and to what extent the search may be performed
- what participants are allowed to redact, modify, add metadata, or otherwise alter the video file during the formation of appended blocks in the blockchain and to what extent the additions and alterations may be performed
- what participants are allowed to access, copy, move, store or delete information for the blockchain from the network and the extent to which such storing and deleting operations may be performed
- what participants are allowed to transfer control of the video file from one tool, storage location, or participant to another and the extent to which such transfers may be performed
- what participants are allowed to integrate and analyze information for the blockchain and the extent to which such integrating and analyzing operations may be performed The smart contract may also control the ledger of the blockchain. For example, the rules of the smart contract may restrict changes to the blockchain unless the initial tracking record for the genesis block of the video file has been inserted into the chain. In one embodiment, analysis of the video file does not have to be complete before the video file is available for playback. The smart contract may be implemented, for example, in Go language code modules which are deployed into the network and which run on the participant nodes. The smart contract may be invoked, for example, via RESTful API by the participants.

The chaincode of the smart contract may be encrypted and executed each time the video file is processed in any manner by a participant. Any violation of the rules of the smart contract may result in failure of an attempt to add a block to the blockchain. As part of the automated actions of the smart contract, node participants may be notified that a failed attempt took place allowing immediate investigation by the relevant parties (i.e. government or law teams, etc.) When such a failure occurs, the processing performed for the video file (e.g., the digital evidence) in association with attempt may be considered to be outside of the chain-of-custody for the blockchain and, thus, void as far as legal use within the network.

When the processing performed on the video file complies with the rules of the smart contract, one of the participants of the network (e.g., a validating peer or a network node running a consensus protocol) validates a new block to be appended to the blockchain based on the processing performed for the video file. The shared ledger may then be updated to reflect the newly appended block, and thus the world state of the blockchain. The network participant (e.g., validating peer) has the authority to deploy, invoke, and query chaincode to perform these operations.

Figure 18:
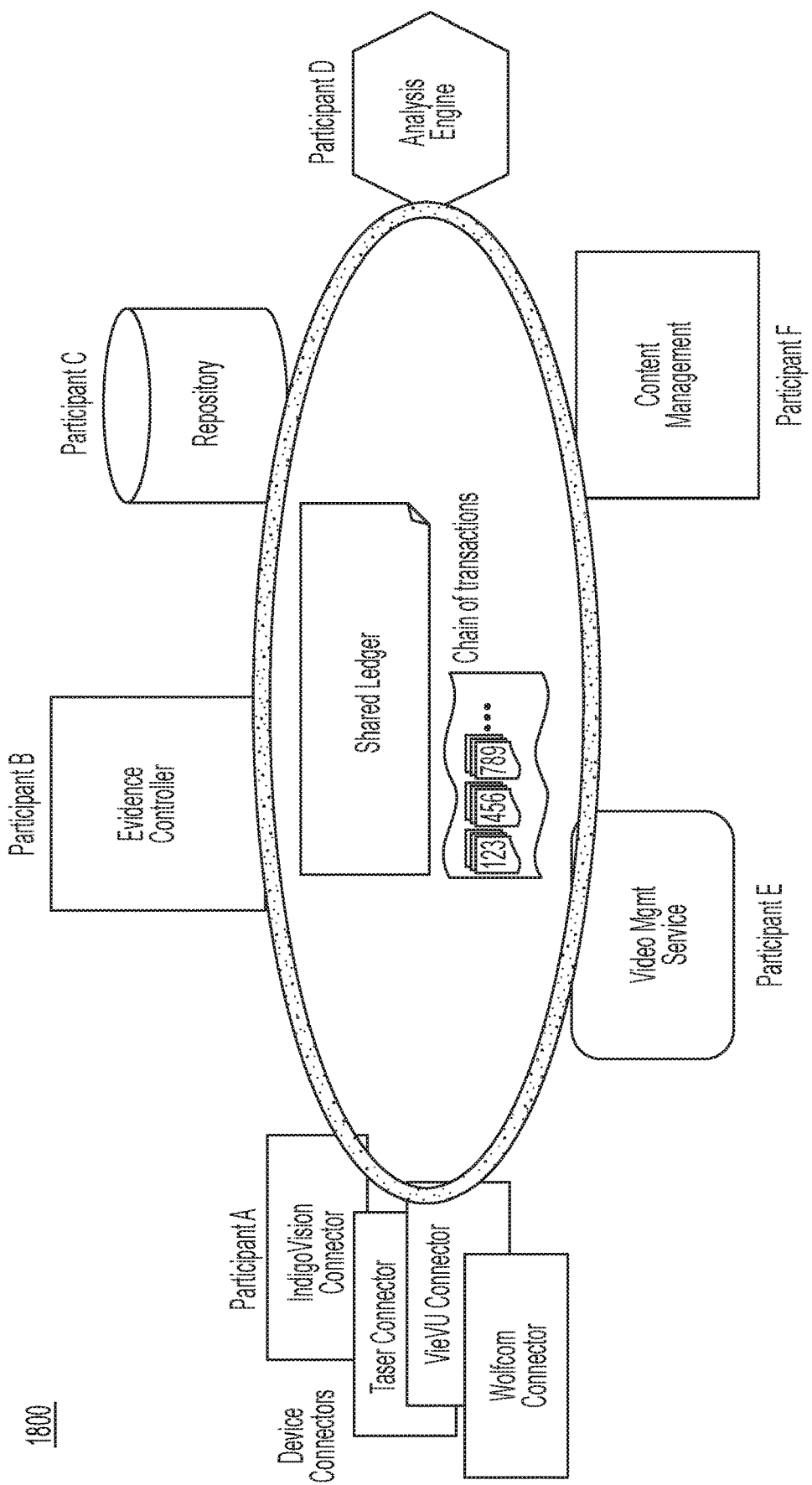
FIG. 18 illustrates an embodiment of a blockchain network.

FIG. 18 illustrates an embodiment of a blockchain network 1800 which may be a more specific implementation of the blockchain network shown in FIG. 17. As illustrated in FIG. 18, the blockchain network 1800 includes participants A to F, all of which have access to a shared ledger of a blockchain for a video file, illustratively shown as a chain of blocks, which, for example, may correspond to the blockchain of FIGS. 12 and 13.

The participants A to F may be different parties or nodes as illustrated in FIG. 18. For example, Participant A may be one or more software interfaces or connections to MEMS sensors used by credentialed entity, e.g., a Wolfcom connector, a VieVu connector, a Taser connector, IndigoVision connector, etc. Participant B may be an evidence controller in the Manage & Store stage and/or the Analytics & Reporting stage. Participant C may be a repository in the Manage & Store stage to store raw video files and other associated information. Participant D may be an analysis engine used to analyze or process the video file in accordance with one or more operations in the Analysis & Reporting stage. Participant E may be a content manager to perform additional management functions as set forth, for example, in the Analysis & Reporting stage. Participant E may be a video management service to share, internally or externally, the blockchain video file (original or processed) with one or more entities.

Figure 19:
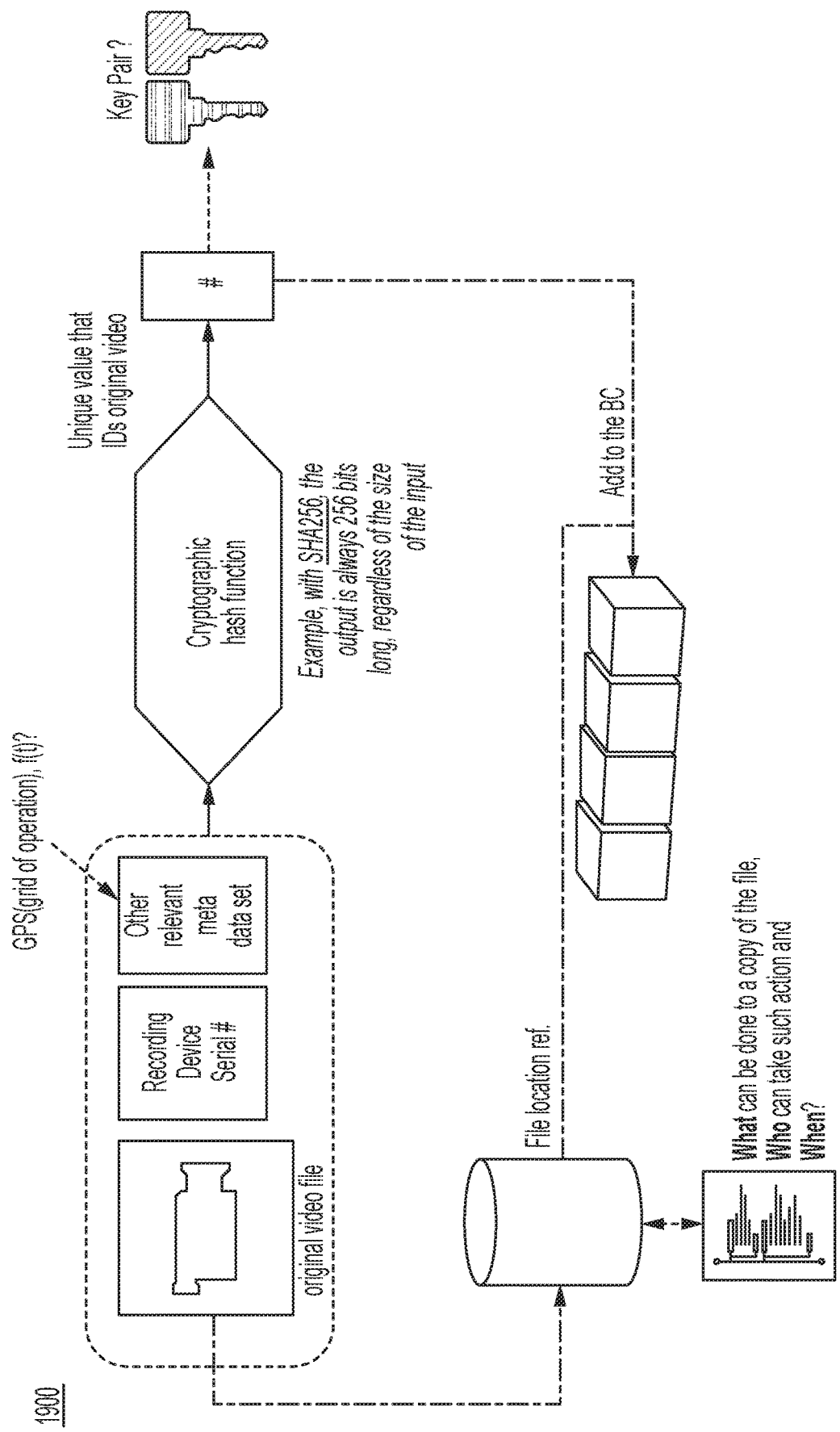
FIG. 19 illustrates an embodiment of a method to generate a blockchain for a video file.

FIG. 19 illustrates an embodiment of a method to generate the blockchain for the video file 1900. The method includes receiving raw video captured, for example, by a body-worn camera (BWC) of a credentialed individual, and information that will form metadata associated with the video file. In this example, the metadata may indicate the camera vendor, a camera serial number, timestamps for the video frames, location (e.g., GPS coordinates) of where the video file was taken, and/or other information relating to the video file and the circumstances under which the video was taken. The raw video and metadata are used to form an original video file that corresponds to the genesis block in the blockchain. The genesis block, thus, serves as an initial starting point of the blockchain.

Figure 20:
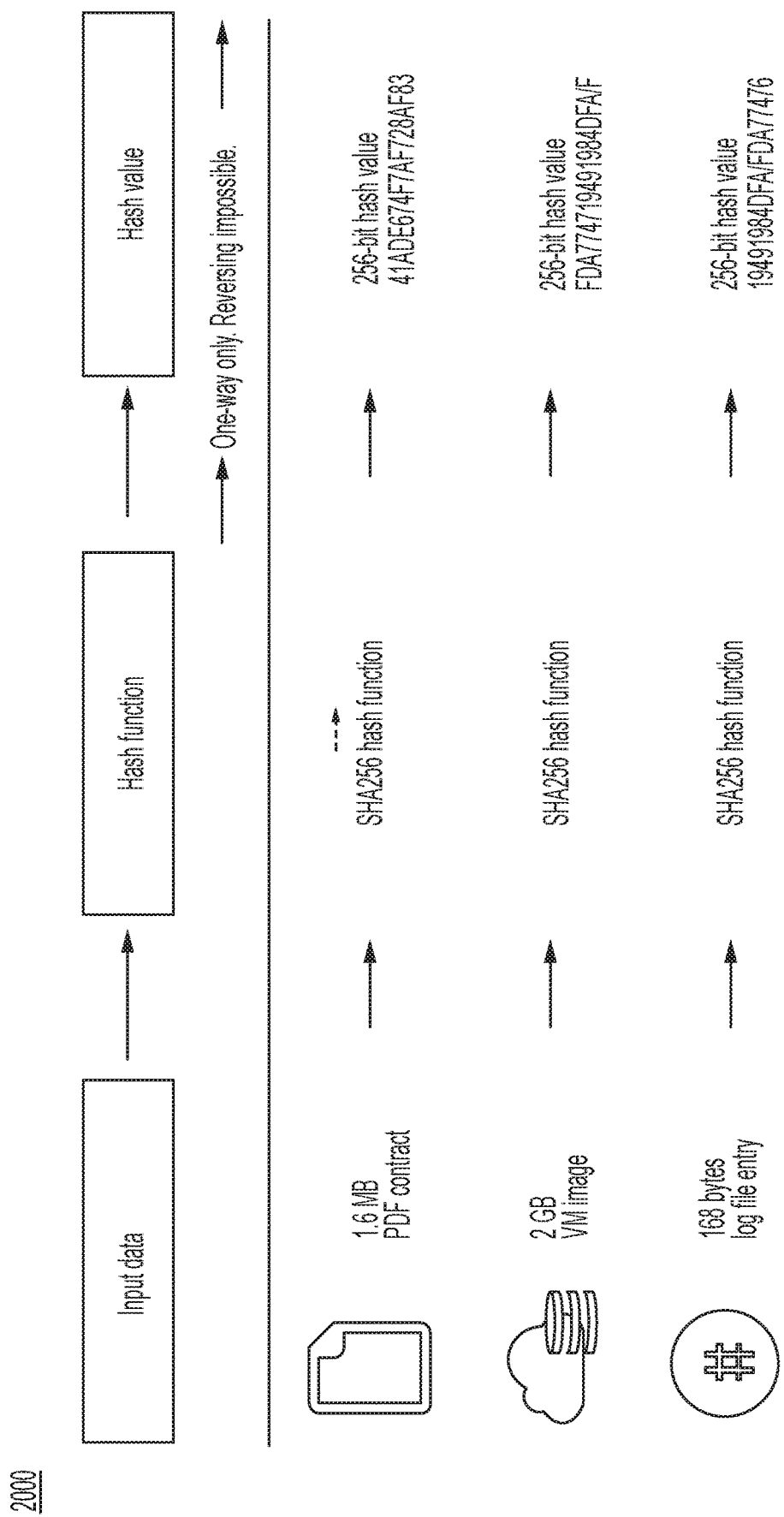
FIG. 20 illustrates an embodiment of hashing in a blockchain.

The genesis block is formed by implementing smart contract code that will gather (or collect) the original video file and metadata, create an object holding this information and then input the object into a cryptographic hash function. The hash function may be, for example, SHA-256 which always provides a 256-bit output irrespective of the size of the input. An example of the hashing performed in a blockchain 2000 is illustrated in FIG. 20, where input information (e.g., .pdf document, a Virtual Machine (VM) image, and a log file entry) of varying lengths produce unique fixed 256-bit outputs.

Figure 21:
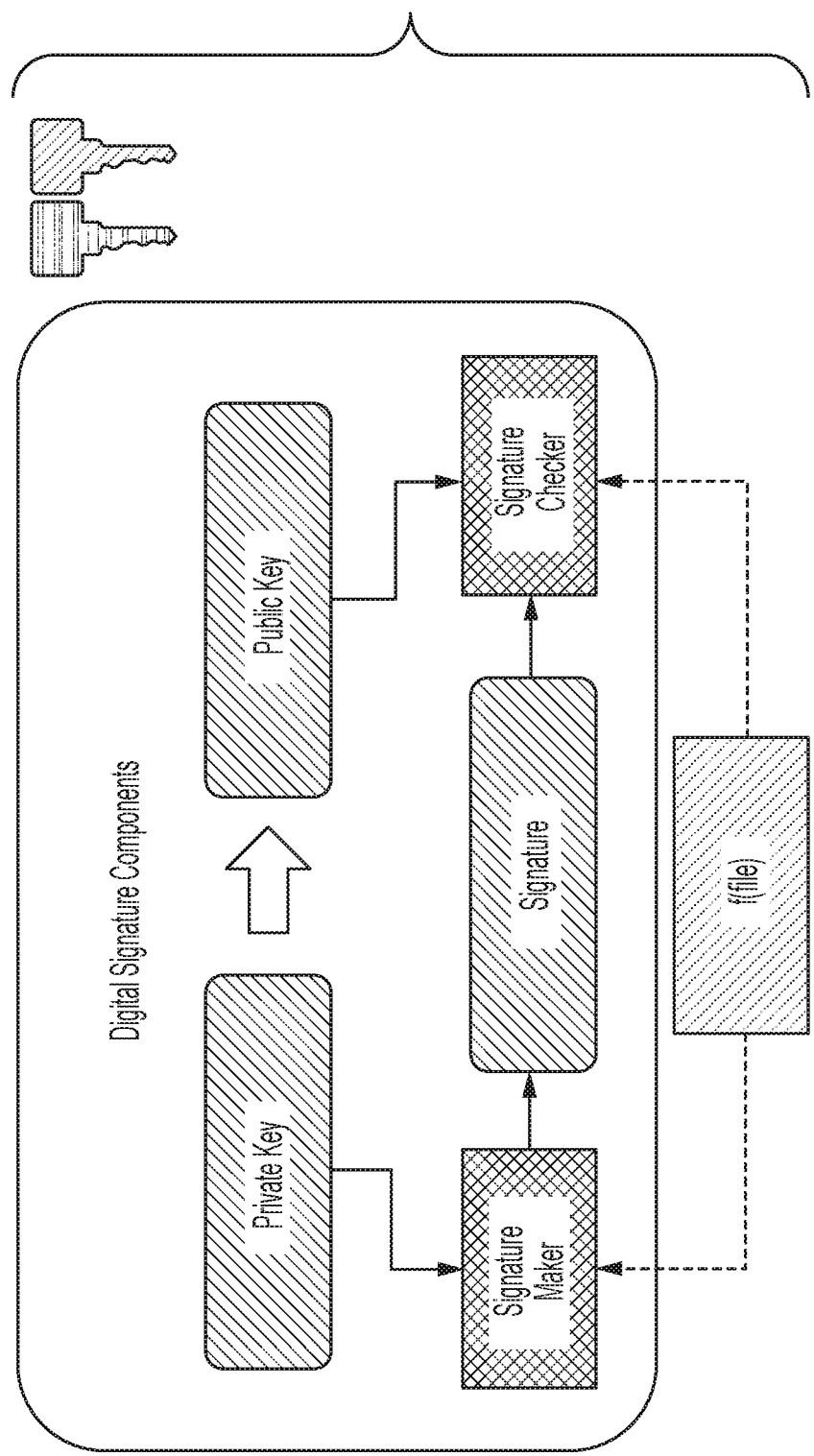
FIG. 21 illustrates an embodiment to encrypt/decrypt blocks in a blockchain network.

The initial tracking value and reference information may also be included in the genesis block as previously described. In one embodiment, the tracking value may correspond to a hashed value of information which includes the location of the original video file. Once hashed, a unique value may be assigned that identifies the original video and the entire video file is encrypted with a digital signature, for example, using a public key-private key pair. The encryption provides a digital signature for the video file and may include, for example, a signature marker logically connected to a signature, which is logically connected to a signature checker in addition to the public and private keys. The encrypted file f(file) may be decrypted 2100 when input into the signature marker and signature checker, as illustrated in FIG. 21.

The genesis block may then be placed in the blockchain (BC) using smart contract chaincode such as: chaincode.invoke.new_evidence(args, [enrollId], [callback]) API.

Once the genesis block is established and the shared ledger updated, an ordered sequence of subsequent blocks is appended to the genesis block to reflect processing performed for the original video file. None of the blocks already included in the blockchain may be modified. Therefore, each appended block includes metadata, tracking values, and other information indicating what processing was performed in that block. The blocks are appended or other actions may be performed using chaincode which:

Checks that a participant has permission to perform the action based on the current state of the evidence Initiates processing activity for the video file and records that the activity is underway using an entry to the shared ledger when the processing activity is completed, appends a new block in the blockchain and updates the shared ledger with a new entry along with information indicating:
a) the SHA-2 computed hash for processed video file
b) new storage location for the processed video file or whether a copy of the file was made and stored in a certain location
c) name of the user (person) using the participant tool, if possible.

The tracking values in each block may be used as a basis to trace back through the blockchain to the original (or primordial) data (video+metadata) in the genesis block. The initial tracking value in the genesis block uniquely identifies the origin of the video evidence of the auditable chain-of-custody of the blockchain.

The blockchain network may interact with participants based on software resident in the participant devices and through one or more application programming interfaces (APIs). This software may assist participant users in performing invoking and querying operations relative to the blockchain. The smart contract chaincode may control an invoking operation (e.g., processing of the video file and appending of blocks to the blockchain). The following is an example of chaincode for a smart contract that factors an invoke action into specific APIs of an evidence management domain:

chaincode.invoke.new_evidence(args, [enrollId], [callback])
chaincode.invoke.store_video(args, [enrollId], [callback])
chaincode.invoke.redact_video(args, [enrollId], [callback])
chaincode.invoke.analyze_video(args, [enrollId], [callback])
chaincode.invoke.search_evidence(args, [enrollId], [callback])

Figure 22:
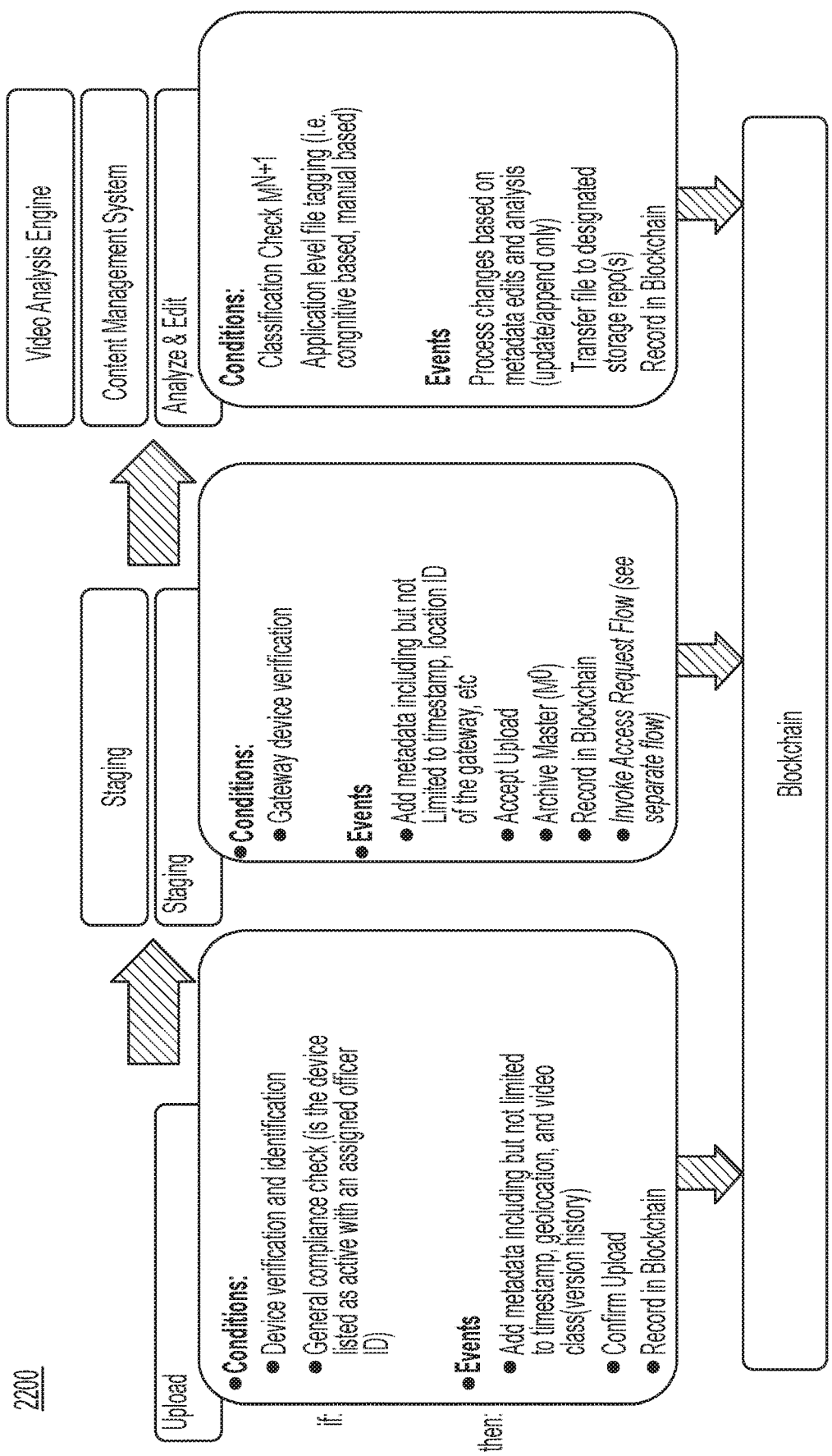
FIG. 22 illustrates an embodiment of a method to generate blocks in a blockchain.

FIG. 22 illustrates another embodiment of a method to generate blocks in the blockchain 2200, which method may be performed, for example, in accordance with the other embodiments described herein. The method is partitioned into three sections: (a) upload, (b) staging, and (c) video analysis, content management, and editing. As discussed below, the operations in each part are only performed if certain conditions are met, and the operations of each section may be controlled by one or more smart contracts.

In the upload section, metadata is uploaded and added to the video file of the blockchain. The video file may be the file in the genesis block or a processed version of the video file referenced in a subsequent block in the chain. The uploaded metadata may include, but is not limited to, timestamp, geolocation, and video class (version history) information associated with the video file. The metadata may be added for the video file as a whole or on a frame-by-frame basis. Once this information is uploaded to the blockchain network, the upload is confirmed and recorded in the blockchain, e.g., as an appended block.

The upload section may perform these operations based on the following conditions: (a) the participant or participant device is identified and verified as being authorized and (b) a general compliance check is performed to determine, for example, whether the participant or the participant device is listed as active with an assigned officer ID.

In the staging section, additional processing may be performed. In one embodiment, the staging section may be limited to uploading only certain information, e.g., timestamp, location ID of the gateway, etc., for purposes of processing the video file. When uploading of this information may be accepted, the information is archived in an Archive Master (Mo) and a new block is appended to the blockchain when an Access Request Flow operation is invoked. The staging section only if the gateway device used to upload the information is verified.

In the video analysis engine section, the video file may be analyzed and edited within the framework of a content management system. This may involve processing changes based on metadata edits and analysis (update/append only) and/or transferring the video file to one or more designated storage repositories. The edits and analysis information is then recorded a block appended in the blockchain.

The processing platforms, nodes, workstations, terminals, servers, gateways, modules, interfaces, or any other software or hardware used to receive information relating to the blockchain may serve as an interface for receiving a video file or other digital content in accordance with the embodiments described herein.

The aforementioned embodiments generate, manage, and track through a blockchain for digital content, including but not limited to digital evidence. The digital evidence may be any type of media file. In other embodiments, the digital evidence may be voting records (e.g., in an election, shareholders meeting, etc.), medical records, intelligence information, or any other type of evidence that may have value in a public or private proceeding.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software to be executed by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a hardware-implemented interface to receive and store a video file;
a hardware-implemented storage area to store a blockchain that references the video file, the blockchain including a plurality of blocks in an ordered sequence, each of the plurality of blocks including a header, a version of the video file with metadata, and a tracking value, the version of the video file in each of the plurality of blocks corresponding to an original version of the video file or a processed version of the video file that is based on a shared or a changed ownership of the video file or on an access or a view of the video file by an entry block of the blockchain or a subsequent one of the plurality of blocks,
wherein version of the video file includes a sequential arrangement of video frames, metadata relating to corresponding ones of the video frames, and information that references a previous one of the video frames; and
a hardware-implemented processor to:
append each of the plurality of blocks, except an entry block, to a previous block of the plurality of blocks with no change to the previous block to form the blockchain,
generate the tracking value for each of the plurality of blocks based on one or more attributes identifying what processing was performed on the version of the video file in a corresponding block, and
trace through the plurality of blocks in the blockchain based on the tracking value for each of the plurality of blocks to confirm an auditable and immutable chain-of-custody of the video file.

2. The hardware-implemented system of claim 1, wherein the one or more attributes in relation to the version of the video file referenced by each of the plurality of blocks include one or more of:
a hash value for the original version of the video file,
identification information of a camera device that captured video of the video file,
a timestamp for the version of the video file,
a storage location of the version of the video file, and
a blockchain network member identification information.

3. The hardware-implemented system of claim 1, wherein the processed version of the video file is further based on one or more of:
redaction, alteration, or other action related to all or portions of the video file referenced by the entry block or a subsequent one of the plurality of blocks,
a copy the video file referenced by the entry block or a subsequent one of the plurality of blocks,
a tag of metadata to the video file in the entry block or a subsequent one of the plurality of blocks, and
movement of a storage location of the video file referenced by the entry block or a subsequent one of the plurality of blocks.

4. The hardware-implemented system of claim 1, further comprising:
one or more smart contracts including rules that define rights of participants to the blockchain or levels of actions permitted by participants for the blockchain.

5. The hardware-implemented system of claim 1, further comprising:
one or more smart contracts including rules to control collection of data, characteristics, or properties of the video file to be added into one or more of the plurality of blocks of the blockchain by the processor.

6. The hardware-implemented system of claim 1, wherein the metadata is based on output of a sensor or device which gathers location information or other data for the video file.

7. A method comprising:
authorizing a blockchain for a video file;
generating a first tracking value for an entry block of the blockchain referencing the video file, the first tracking value generated based on first data and the video file;
receiving second data for each of additional blocks in the blockchain;
generating second tracking values corresponding to each additional block based on the second data, the second tracking values identifying what processing was performed on the video file in each corresponding block of the additional blocks;
forming the additional blocks including corresponding second tracking values;
appending the additional blocks to the entry block, the entry block and the additional blocks linked in an ordered sequence, each of the additional blocks referencing a version of the video file that corresponds to an original version of the video file, as referenced by the entry block or a processed version of the video file that is based on sharing or changing an ownership of the video file or accessing or viewing the video file or a subsequent one of the additional blocks, the second data in each of the additional blocks indicative of processing performed on the version of the video file in that block,
wherein the referenced version of the video file includes a sequential arrangement of video frames, metadata relating to corresponding ones of the video frames, and information that references a previous one of the video frames; and
tracing through the blockchain based on the first tracking value and the second tracking values to confirm an auditable and immutable chain-of-custody of the video file.

8. The method of claim 7, wherein the first tracking value and the second tracking values are based on one or more attributes relating to the version of the video file in corresponding ones of the entry block and additional blocks.

9. The method of claim 8, wherein the one or more attributes include one or more of:
a hash value for the original version of the video file,
identification information of a camera device that captured video of the video file,
a timestamp for the version of the video file,
a storage location of the version of the video file, and
a blockchain network member identification information.

10. The method of claim 7, wherein the processed version of the video file is further based on one or more of:
redacting or altering portions of the video file referenced by the entry or a subsequent one of the plurality of blocks,
copying the video file referenced by the entry or a subsequent one of the plurality of blocks,
tagging metadata to the video file in the entry or a subsequent one of the plurality of blocks, and
moving a storage location of the video file referenced by the entry or a subsequent one of the plurality of blocks.

11. The method of claim 7, further comprising:
controlling appending of the additional blocks based on one or more smart contracts, wherein the one or more smart contracts include rules that define rights of participants of the blockchain or levels of processing permitted by participants for the blockchain.

12. The method of claim 7, further comprising:
controlling generating transactions corresponding to the entry block and the additional blocks of the blockchain based on one or more smart contracts.

13. The method of claim 7, wherein the first data and the second data are based on output of a sensor or device which gathers location information or other data for the video file.

14. A non-transitory computer-readable medium storing one or more instructions that when executed by a processor configure the processor to:
authorize a blockchain for a video file;
generate a first tracking value based on first data and the video file;
form an entry block of the blockchain referencing the video file and the first tracking value;
generate second tracking values corresponding to each additional block of the blockchain based on the second data, the second tracking values identifying what processing was performed on the video file in each corresponding block of the additional blocks;
form the additional blocks including corresponding second tracking values;
append the additional blocks to the entry block, the additional blocks linked in an ordered sequence, each of the additional blocks referencing a version of the video file that corresponds to an original version of the video file as set forth in the entry block or a processed version of the video file that is based on sharing or changing an ownership of the video file or accessing or viewing the video file by the entry block or a subsequent one of the additional blocks, the second data in each of the additional blocks indicative of processing performed on the version of the video file in that block,
wherein the referenced version of the video file includes a sequential arrangement of video frames, metadata relating to corresponding ones of the video frames, and information that references a previous one of the video frames; and
trace through the blockchain based on the first tracking value and the second tracking values to confirm an auditable and immutable chain-of-custody of the video file.

15. The computer-readable medium of claim 14, wherein the first tracking value and the second tracking values are based on one or more attributes relating to the version of the video file referenced by corresponding ones of the genesis and additional blocks.

16. The computer-readable medium of claim 15, wherein the one or more attributes include one or more of:
a hash value for the original version of the video file,
identification information of a camera device that captured video of the video file,
a timestamp for the version of the video file,
a storage location of the version of the video file, and
a blockchain network member identification information.

17. The computer-readable medium of claim 14, wherein the processed version of the video file is further based on one or more of:
redaction, alteration, or other action related to all or portions of the video file referenced by the entry block or a subsequent one of the plurality of blocks,
a copy the video file referenced by the entry block or a subsequent one of the plurality of blocks,
a tag of metadata to the video file in the entry block or a subsequent one of the plurality of blocks, and
movement of a storage location of the video file referenced by the entry block or a subsequent one of the plurality of blocks.

* * * * *